United States Patent
Cho et al.

(10) Patent No.: US 9,223,348 B2
(45) Date of Patent: Dec. 29, 2015

(54) SPLIT KEYBOARD MODIFICATION FOR A PULL-OUT FLEXIBLE DISPLAY

(75) Inventors: Eunhyung Cho, Seoul (KR); Hyorim Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 772 days.

(21) Appl. No.: 13/366,033

(22) Filed: Feb. 3, 2012

(65) Prior Publication Data
US 2013/0203469 A1 Aug. 8, 2013

(51) Int. Cl.
G06F 3/041 (2006.01)
G06F 1/16 (2006.01)
H04M 1/02 (2006.01)
G06F 3/0488 (2013.01)

(52) U.S. Cl.
CPC .......... *G06F 1/1643* (2013.01); *G06F 1/1647* (2013.01); *G06F 1/1652* (2013.01); *G06F 3/04886* (2013.01); *H04M 1/0241* (2013.01); *H04M 1/0268* (2013.01); *G06F 2200/1614* (2013.01); *G06F 2203/04803* (2013.01); *G06F 2203/04808* (2013.01); *H04M 2250/22* (2013.01)

(58) Field of Classification Search
CPC . H04M 1/0268; H04M 1/0241; G06F 1/1652; G06F 2203/04102
USPC ................. 455/556.1, 566; 463/16, 30, 40
See application file for complete search history.

(56) References Cited

U.S. PATENT DOCUMENTS

| | | | |
|---|---|---|---|
| 2006/0061555 A1 | 3/2006 | Mullen | |
| 2008/0303782 A1* | 12/2008 | Grant et al. | 345/156 |
| 2010/0311488 A1* | 12/2010 | Miller et al. | 463/16 |
| 2013/0201208 A1* | 8/2013 | Cho et al. | 345/619 |

* cited by examiner

*Primary Examiner* — Sam Bhattacharya
(74) *Attorney, Agent, or Firm* — Birch, Stewart, Kolasch & Birch, LLP

(57) ABSTRACT

A display device may have displayed a user input interface, such as a virtual keyboard, on a main display of the display device. Then as a secondary flexible display is pulled out from within the display device, various methods for handling the display of the user input interface between the main display and the secondary flexible display are described. The display of the user input interface between the main display and the flexible display will be controlled based upon a combination of user input touch gestures on the main display and the flexible display, as well as a measured length of the pulled out portion of the flexible display.

33 Claims, 32 Drawing Sheets

SPLIT KEYBOARD MODIFICATION FOR A PULL-OUT FLEXIBLE DISPLAY

BACKGROUND OF THE INVENTION

Portable display devices have come to play an important role in many people's lives. Examples of portable display devices being used today include mobile phones, portable gaming devices, personal digital assistants (PDAs), portable navigation systems and portable video players to name a few.

To emphasize the portability of these display devices, the trend has been to make new portable display devices smaller in size. The obvious trade off for making smaller portable display devices that are easier to carry around is that the display screen size has been sacrificed. Consumers are then left with the choice of sacrificing portability for a larger screen size, or sacrificing screen size for increased portability.

Therefore there is a need for a portable display device that is able to both maintain its portability while minimizing the sacrifice in display screen size. To achieve this goal, various types of flexible display screens have been introduced for use on portable display devices where the shape of the display screen is able to be deformed. By allowing the shape of the display screen to be deformed, this allows for the display screen to be enlarged or decreased depending on the situation while still maintaining a minimal overall size of the portable display device. One such example is a portable display device that employs a rollable type flexible display screen.

It follows that for each type of flexible display screen, a unique user interface is required to handle the unique physical properties of the particular flexible display screen.

SUMMARY OF THE INVENTION

Accordingly, the present invention is directed to a portable display device that incorporates a flexible display being housed within the portable display device. The flexible display provides an additional display screen in addition to a main display found on the body of the display device. With the additional display screen provided by the flexible display, new methods for handling the display of user input interfaces between the main display and the flexible display are needed. Therefore it is an object of the present invention to substantially resolve the limitations and deficiencies of the related art when it comes to controlling the display of a user input interface between a main display and an additional flexible display.

To achieve this objective, the present invention is directed to a display device, the display device comprising a main device body that includes at least a main display having a set length, wherein a user input interface is displayed on the main display; a flexible display; a touch input detecting unit configured to detect a touch input contact on the main display; a measuring unit configured to measure a length of a portion of the flexible display that is displayed, and a processor configured to receive the measured length of the flexible display, and, in response to the touch input, determine whether to transition the display of the user input interface from the main display to the flexible display based on the measured length of the flexible display.

Preferably, the display device further comprises a flexible display housing within the main device body configured to house the flexible display.

More preferably, the length of the portion of the flexible display is measured by measuring a length of the flexible display that is pulled out from within the flexible display housing.

Preferably, the touch input on the main display is initiated over an area that overlaps the user input interface.

Preferably, when the measured length of the flexible display is a first length that is shorter than the set length of the main display, the processor controls the display of the user input interface to remain on the main display in response to the touch input.

Preferably, when the measured length of the flexible display is a second length that is at least equal to the set length of the main display, the processor enables a display of the user input interface to be displayed on the flexible display in response to the touch input.

More preferably, the touch input maintains contact from a first contact point to a second contact point on the main display.

More preferably, the touch input maintains contact from a first contact point on the main display to a second contact point on the flexible display.

Preferably, the measured length of the flexible display is a second length that is at least equal to the set length of the main display, the processor controls the display of the user input interface to partition into at least a first portion that is displayed on the main display and a second portion that is displayed on the flexible display in response to the touch input.

More preferably, the touch input comprises: a first touch input that maintains contact on the main display over a first half of the user input interface, and a second touch input that maintains contact on the main display from a first contact point to a second contact point that overlaps over a second half of the user input interface.

More preferably, the touch input comprises: a first touch input that maintains contact on the main display over a first half of the user input interface, and a second touch input that maintains contact from a first contact point that overlaps over a second half of the user interface on the main display to a second contact point located on the flexible display.

More preferably, a range of a user's finger is detected by the touch input detecting unit, and the processor is configured to control the size of the first portion and the second portion to be displayed within the detected range of the user's finger.

Preferably, when the measured length of the flexible display is a third length that is greater than the set length of the main display, the processor controls the display of the user input interface to be displayed on the flexible display in response to the touch input.

More preferably, a new user input interface is displayed on the flexible display.

More preferably, a new user input interface that is transitioned to be displayed on the flexible display when the measured length of the flexible display is greater than the set length of the main display is different from a user input interface that is displayed on the flexible display when the measured length of the flexible display is equal to the set length of the main display.

Preferably, when the measured length of the flexible display is a fourth length that is equal to two times the set length of the main display, the processor controls the display of the user input interface to be displayed on the flexible display in response to the touch input.

More preferably, a new user input interface is transitioned to be displayed on the flexible display.

More preferably, a new user input interface that is transitioned to be displayed on the flexible display when the measured length of the flexible display is equal to two times the set length of the main display is different from a user input interface that is displayed on the flexible display when the measured length of the flexible display is equal to the set length of the main display.

To further achieve objectives of the present invention, the present invention is additionally directed to a display device, the display device comprising: a main device body that includes at least a main display having a set length, wherein a user input interface is displayed on the main display; a flexible display; a measuring unit configured to measure a length of the flexible display that is pulled out from the flexible display housing, and a processor configured to receive the measured length of the flexible display that is pulled out from the flexible display housing, and determine whether to transition the display of the user input interface from the main display to the flexible display based on the measured length of the flexible display that is pulled out from the flexible display housing.

Preferably, the display device further comprises: a flexible display housing within the main device body configured to house the flexible display.

More preferably, the length of the portion of the flexible display is measured by measuring a length of the flexible display that is pulled out from within the flexible display housing.

Preferably, when the measured length of the flexible display is a first length that is shorter than the set length of the main display, the processor controls the display of the user input interface to remain on the main display.

Preferably, when the measured length of the flexible display is a second length that is at least equal to the set length of the main display, the processor controls the display of the user input interface to be displayed on the flexible display.

Preferably, when the measured length of the flexible display is a second length that is at least equal to the set length of the main display, the processor controls the display of the user input interface to partition into at least a first portion that is displayed on the main display and a second portion that is displayed on the flexible display.

More preferably, a range of a user's finger is detected by the touch input detecting unit, and the processor is configured to control the size of the first portion and the second portion to be displayed within the detected range of the user's finger.

Preferably, a new user input interface that is transitioned to be displayed on the flexible display when the measured length of the flexible display is greater than the set length of the main display is different from a user input interface that is displayed on the flexible display when the measured length of the flexible display is equal to the set length of the main display.

Preferably, when the measured length of the flexible display is a fourth length that is equal to two times the set length of the main display, the processor controls the display of the user input interface to be displayed on the flexible display in response to the touch input.

More preferably, a new user input interface is transitioned to be displayed on the flexible display.

More preferably, a new user input interface that is transitioned to be displayed on the flexible display when the measured length of the flexible display is equal to two times the set length of the main display is different from a user input interface that is displayed on the flexible display when the measured length of the flexible display is equal to the set length of the main display.

To further achieve objectives of the present invention, the present invention is additionally directed to a method for transitioning a display of a user input interface by a display device, the method comprising: displaying the user input interface on a main display of the display device; exposing a flexible display for display; measuring a length of the flexible display that is exposed; detecting a touch input contact on the main display, and controlling the display of the user input interface based on the measured length of the flexible display that is exposed and the detected touch input.

Preferably, the method further comprises: receiving an incoming call on the display device; displaying a message at a position on the main display that overlaps the user input interface indicating the incoming call is being received, and answering the incoming call by contacting the main display at a position that corresponds to the message.

To further achieve objectives of the present invention, the present invention is additionally directed to a method for transitioning a display of a user input interface by a display device, the method comprising: displaying the user input interface on a main display of the display device; exposing a flexible display for display; measuring a length of the flexible display that is exposed, and controlling the display of the user input interface based on the measured length of the flexible display that is exposed.

Preferably the method further comprises: receiving an incoming call on the display device; displaying a message at a position on the main display that overlaps the user input interface indicating the incoming call is being received, and answering the incoming call by contacting the main display at a position that corresponds to the message.

Further objects, features and advantages of the present invention will become apparent from the detailed description that follows. It is to be understood that both the foregoing general description and the following detailed description of the present invention are exemplary and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to exemplary embodiments of the present invention, examples of which are illustrated in the accompanying drawings. It will be apparent to one of ordinary skill in the art that in certain instances of the following description, the present invention is described without the specific details of conventional details in order to avoid unnecessarily distracting from the present invention. Wherever possible, like reference designations will be used throughout the drawings to refer to the same or similar parts. All mention of a display device is to be understood as being made to a display device of the present invention unless specifically explained otherwise.

Figure 1:
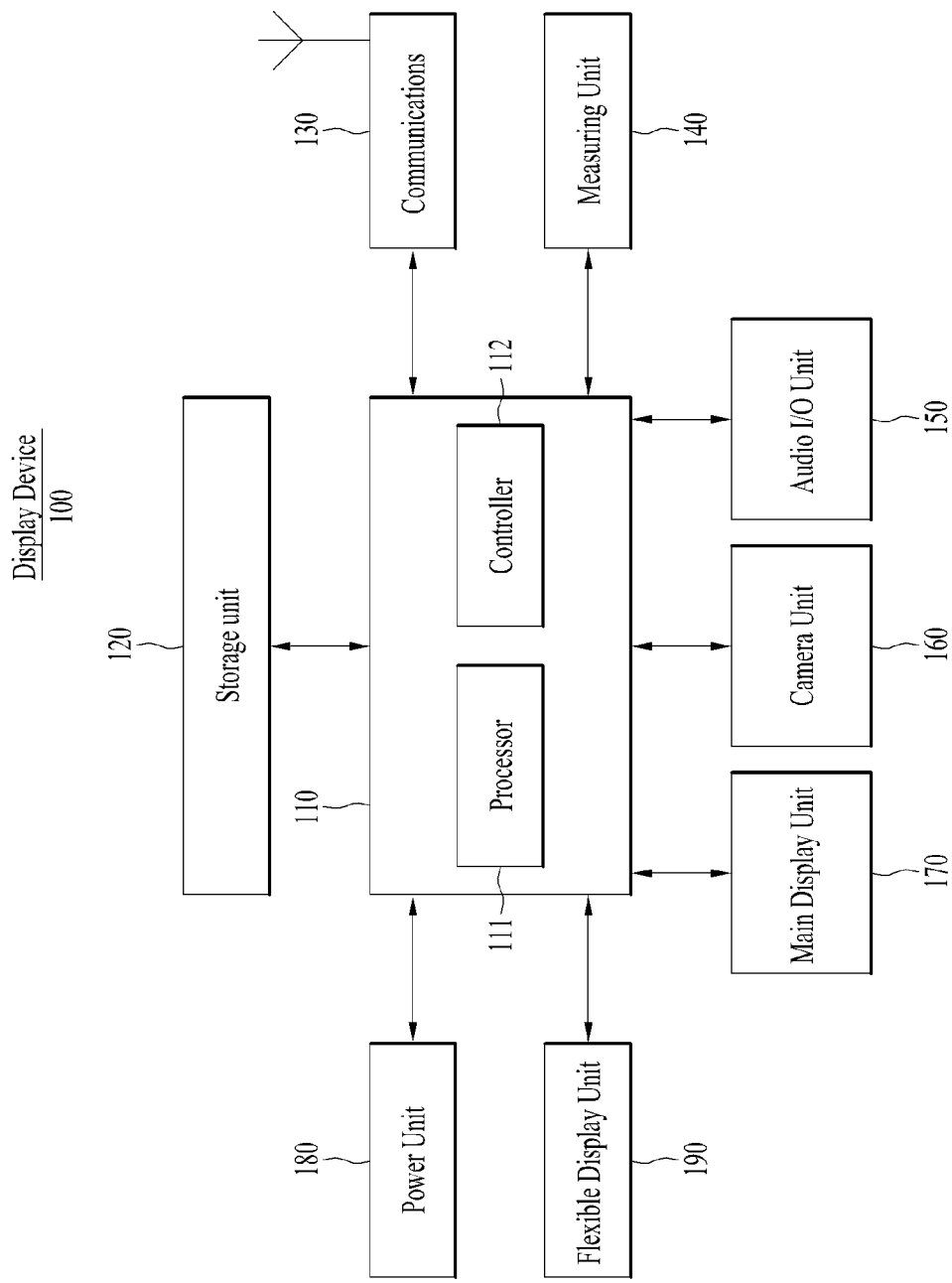
FIG. 1 illustrates a block diagram for a portable display device, according to the present invention.

FIG. 1 illustrates a general architecture block diagram for a display device 100 according to some embodiments of the present invention. It is to be appreciated that it is within the scope of the present invention to utilize flexible display devices that may include a fewer, or greater, number of components than what is expressly illustrated in FIG. 1. The display device 100 illustrated in FIG. 1 may, for example, be a mobile telecommunications device, notebook computer, tablet computing device, portable navigation device, portable video player or personal digital assistant (PDA).

As illustrated in FIG. 1, the display device 100 includes a processor 111, a controller 112, a storage unit 120, a communications unit 130, a measuring unit 140, an audio input/output (I/O) unit 150, a camera unit 160, a main display unit 170, a power unit 180 and a flexible display unit 190. The processor 111 and the controller 112 may be part of a single chip set 110 as illustrated in FIG. 1, or alternatively may be part of separate chip sets. Alternatively, the display device may only be comprised of a processor 111 without the separate controller 112 according to some embodiments of the present invention.

Although not specifically illustrated in FIG. 1, components of the display device 100 are able to communicate with each other via one or more communication buses or signal lines. It should also be appreciated that the components of the display device 100 may be implemented as hardware, software, or a combination of both hardware and software (e.g. middleware).

The storage unit 120 illustrated in FIG. 1 may include non-volatile type memory such as non-volatile random-access memory (NVRAM) or electrically erasable programmable read-only memory (EEPROM), commonly referred to as flash memory. The storage unit 120 may also include other forms of high speed random access memory such as dynamic random-access memory (DRAM) and static random-access memory (SRAM), or may include a magnetic hard disk drive (HDD). In cases where the flexible display device is a mobile device, the storage unit 120 may additionally include a subscriber identity module (SIM) card for storing a user's profile information.

The storage unit 120 is tasked with storing various data and applications that are needed to operate the display device. As will be described in more detail throughout this description, the display device of the present invention employs a touch sensitive main display and a touch sensitive flexible display. By providing visual objects and cues on the touch sensitive main display and flexible display, a user is provided with a touch sensitive user interface (UI) for interacting and controlling the display device. It stands then that the set of instructions corresponding to the touch sensitive UI required for detecting and interpreting the touch input contacts on the touch sensitive displays are stored within the storage unit 120. And during the operation of the display device, the processor 111 is tasked with processing the set of instructions corresponding to the touch sensitive UI and controlling the various components of the display device 100 according to the detected touch inputs.

Individual applications may also be stored on the storage unit 120 as embodied by a set of specific instructions to be processed by the processor 111 in order to execute the application on the display device 100. Some examples of applications that may be stored on the storage unit 120 include e-mail applications, video viewing applications, audio playing applications, web browsing applications, and gaming applications.

In some embodiments of the present invention, the storage unit 120 may further include access to remote storage in a cloud storage computing environment. The remote storage may be accessed via the communications unit 130.

The communications unit 130, as illustrated in FIG. 1, may include RF circuitry that allows for wireless access to outside communications networks such as the Internet, Local Area Networks (LANs), Wide Area Networks (WANs) and the like. The wireless communications networks accessed by the communications unit 130 may follow various communications standards and protocols including, but not limited to, Global System for Mobile Communications (GSM), Enhanced Data GSM Environment (EDGE), code division multiple access (CDMA), wideband code division multiple access (W-CDMA), time division multiple access (TDMA), Bluetooth, Wireless Fidelity (Wi-Fi), Short Message Service (SMS) text messaging and any other relevant communications standard or protocol that allows for wireless communication by the display device 100. In some embodiments of the present invention, the communications unit 130 may also include a tuner for allowing for the reception of broadcast signals according to, for example, the digital multimedia broadcasting (DMB), digital video broadcasting technologies, advanced television systems committee (ATSC), integrated services digital broadcasting (ISDB) or digital terrestrial multimedia broadcast (DTMB) standards.

Additionally, the communications unit 130 may include various input and output interfaces (not shown) for allowing wired data transfer communication between the display device 100 and an external electronics device. The interfaces may include, for example, interfaces that allow for data transfers according to the family of universal serial bus (USB) standards, the family of IEEE 1394 standards or other similar standards that relate to data transfer.

The measuring unit 140, illustrated in FIG. 1, is comprised of circuitry that allows the measuring unit 140 to measure the length of a flexible display that is pulled out from a flexible display housing within the display device 100. A more detailed description of the measuring unit 140 will be provided later throughout this description.

The audio I/O unit 150 illustrated in FIG. 1 may include a speaker or headphone interface for outputting audio signals originating from the storage unit 120 of the display device 100. The audio I/O unit 150 may also include a microphone for inputting audio signals into the display device 100. Audio signals that are inputted to the display device 100 through the microphone are transmitted to the processor 111 for processing.

The camera unit 160 illustrated in FIG. 1 may include an RGB camera for capturing images. Images captured by the RGB camera may then be stored on the storage unit 120. The camera unit 160 may additionally include a depth sensing camera. The depth sensing camera is able to capture images and measure distances of objects that are captured based on sonar type technologies or infrared type technologies. Images captured by the camera unit 150 may be transmitted to the processor 111 for processing either prior to, or following a storage, on the storage unit 120.

The main display unit 170 is primarily comprised of a main display and a touch input detecting unit. Together with the touch input detecting unit, a main display of the display device may be considered to be a touch sensitive display, capable of detecting touch input contacts on its surface. In this way, the main display is able to provide an input and output UI for a user of the display device 100 to input commands and control objects displayed on the main display. It should be understood that all subsequent mention of main display refers to the touch sensitive main display unless specifically noted otherwise.

Figure 3A:
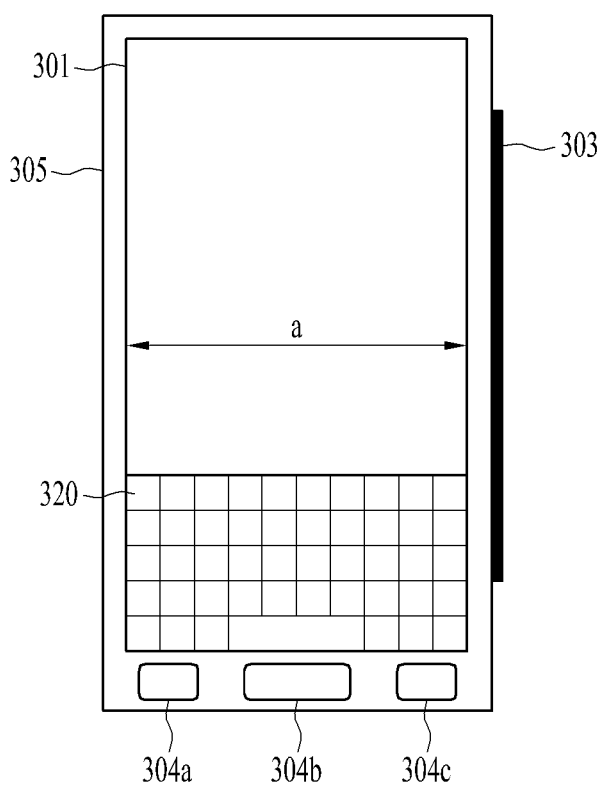
FIG. 3A illustrates a portable display device in an initial state displaying a user input interface, according to the present invention.

For instance, a UI according to the present invention may display a virtual keyboard 320 on a main display 301 of a display device, as seen in FIG. 3A. A user may then input commands onto the touch sensitive main display 301 by contacting the main display 301 at specific locations that correspond to specific keys of the keyboard 320. The contact point of the user's touch input on the main display 301 is then transmitted to the processor 111 and compared to a layout of the displayed keyboard 320. And in this way the processor 111 may determine which key of the keyboard 320 was contacted on the touch sensitive main display 301, and thus intended to be inputted by the user.

The main display of the main display unit 170 may be implemented using liquid crystal display (LCD) technology that allows for a thin display screen and touch sensitive capabilities, although other similar display technologies such as organic light emitting diode (OLED) display technology, electroluminescent display (ELD) technology or electronic paper technology may be implemented in other embodiments of the present invention.

The power unit 180 illustrated in FIG. 1 is a power source for providing the power to operate the various components/units of the flexible display device 100. The power unit 180 may include a battery or an interface for providing power from external power sources (e.g. direct current adaptor, alternating current adaptor).

The flexible display unit 190 illustrated in FIG. 1 is comprised primarily of a flexible display and a touch input detecting unit. Therefore, like the main display, a user's touch input contact on the flexible display may be detected. For at least this reason, it should be understood that all subsequent mention of the flexible display refers to a touch sensitive flexible display unless specifically noted otherwise.

The flexible display itself is preferably made using organic light emitting diode (OLED) display technology or other similar flexible display technologies such as electroluminescent display (ELD) technology or electronic paper technology that allows for a high degree of flexibility. The flexible display 202 is required to have a high degree of flexibility to ensure deformation of the flexible display 202 that will allow it to be stored within an inner flexible display housing unit 207 of the display device 100 as illustrated in FIG. 2D. Preferably the flexible display 202 is able to be stored within the inner flexible display housing unit 207 in a rolled up state as depicted in FIG. 2D.

As illustrated in FIG. 2D, due to its flexible properties, the flexible display 202 may be stored within the flexible display housing unit 207 when it is not in use, and thus does not add to the overall size of the display device. The flexible display 202 also shares the benefits of being a touch sensitive display screen like the main display 201. So the flexible display 202 may visually output displays of text, graphics, video and also receive touch input contacts. The touch sensitive characteristic of the flexible display 202 allows the user to interact with the display device via touch inputs made on the touch sensitive flexible display 202. Like with the touch sensitive main display 201, touch inputs detected on the flexible display 202 are transmitted to the processor 111 for processing. According to the present invention, multi-touch contacts may be detected on either one of the main display 201 or flexible display 202, the detection transmitted to the processor 111 and recognized by the processor 111 as being the intended multi-touch contact type touch input.

Figure 2A:
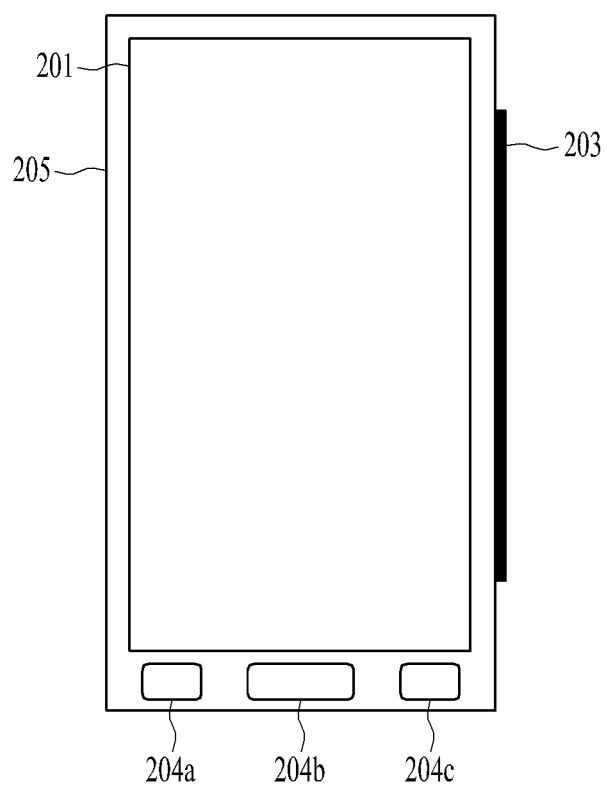
FIG. 2A illustrates a portable display device in an initial state, according to the present invention.

FIG. 2A illustrates a display device according to the present invention in an initial state. In this initial state the main display 201 is prominently seen on the front side of the display device. Also visible from the front side are a variety of input keys 204a, 204b and 204c. In some embodiments the input keys 204a, 204b and 204c may be implemented as physical buttons. Alternatively, the input keys 204a, 204b and 204c may be implemented as touch input keys that are displayed as part of the main display 201 in other embodiments of the present invention. Input keys that are implemented as touch input keys may be displayed as needed, and then controlled to be taken off display when not needed, depending on the current situation's requirements. Also seen in FIG. 2A is a display device body 205 that generally describes an outer shell of the display device.

Figure 2B:
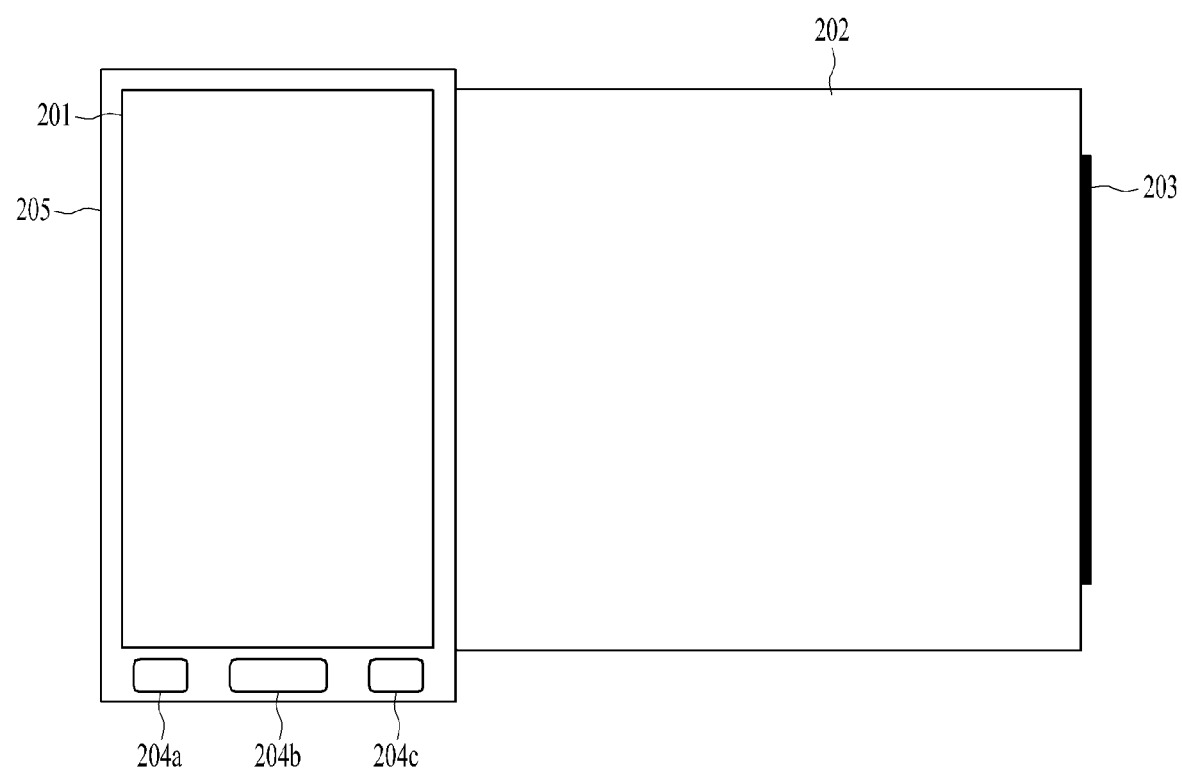
FIG. 2B illustrates a portable display device in a fully extended state, according to the present invention.

The handle 203, seen in FIG. 2A to be protruding out from an outer edge of the display device body 205, is attached to the flexible display 202 that is stored within the display device body 205 in the initial state of FIG. 2A. FIG. 2B then illustrates an extended state where the flexible display 202 has been pulled out from within the display device body 205. Preferably a user will hold onto the handle 203 and pull on the handle 203 to accomplish the task of pulling the flexible display 202 out from within the main device body 205. Although FIG. 2A illustrates the handle 203 to be protruding from the outer edge of the main device body 205, in some embodiments the handle 203 may be constructed to lay flush with the outer edge of the display device body 205.

Figure 2C:
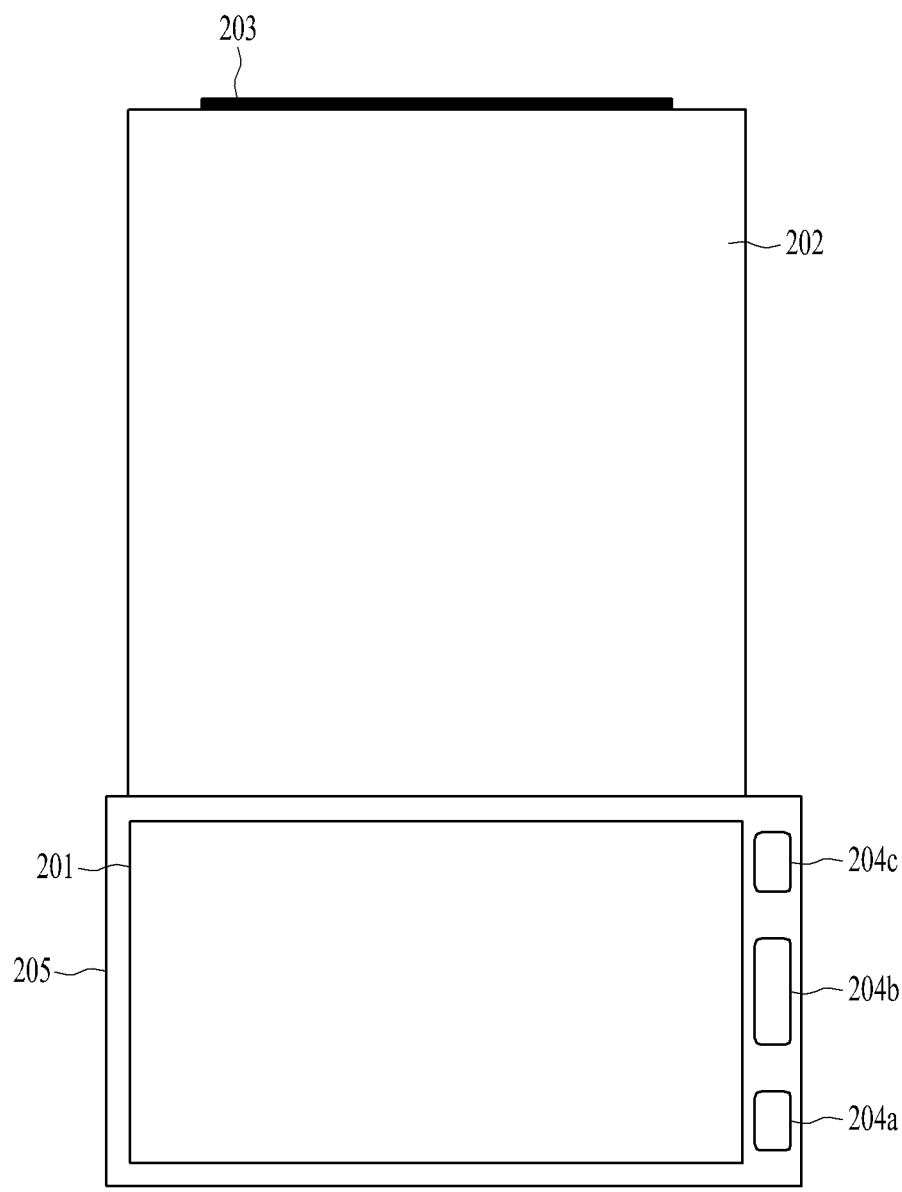
FIG. 2C illustrates a landscape viewing orientation for a portable display device, according to the present invention.
Figure 2D:
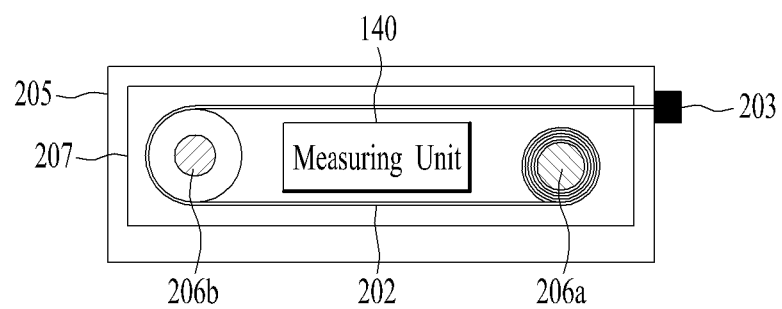
FIG. 2D illustrates an inner workings view of a portable display device, according to the present invention.

According to some embodiments, a user may view content on the main display 201 and flexible display 202 of the display device in the profile orientation as illustrated in FIGS. 2A and 2B. In other embodiments, a user may view content on the main display 201 and flexible display 202 of the display device in the landscape orientation as illustrated in FIG. 2C. A gyroscopic and accelerometer sensing unit may additionally be included as part of the display device to detect the current orientation of the display device. For instance the gyroscopic and accelerometer sensing unit may detect the display device to be held in a profile viewing orientation, as seen in FIG. 2B, and send corresponding information to the processor 111. Likewise, the gyroscopic and accelerometer sensing unit may detect the display device to be held in a landscape viewing orientation, as seen in FIG. 2C, and send corresponding information to the processor 111. Then the processor 111 may receive such orientation information from the gyroscopic and accelerometer sensing unit and use the orientation information to control the display on the main display 201 and flexible display 202 accordingly. A more detailed description of the various display control measures that are made based on the orientation of the display device according to the present invention will be given throughout this description.

FIG. 2D illustrates a view of the display device that shows the inner workings of the display device according to the present invention. Within the main device housing 205, there is generally a flexible display housing unit 207 that stores the flexible display 202. To aid with the pull out operation of the flexible display 202 from within the flexible display housing unit 207, a main roller 206a and a guide roller 206b are provided. In the initial state where the flexible display 202 is fully maintained within the flexible display housing unit 207, a portion of the flexible display 202 is seen to be wound around the main roller 206a. Then as the user pulls on the handle 203 to extend the flexible display 202 out of the flexible display housing unit 207, the portion of the flexible display 202 that is wound around the main roller 206a is gradually unwound. During this pull-out process, the guide roller 206b serves to safely guide the flexible display 202 as it is bent and rolled over the guide roller 206b on its way to be pulled out of the flexible display housing unit 207.

Meanwhile, the measuring unit 140 proceeds to measure a length of the flexible display 202 that is pulled out from the flexible display housing unit 207. The measured length information is then transmitted to the processor 111 for processing.

Figure 12:
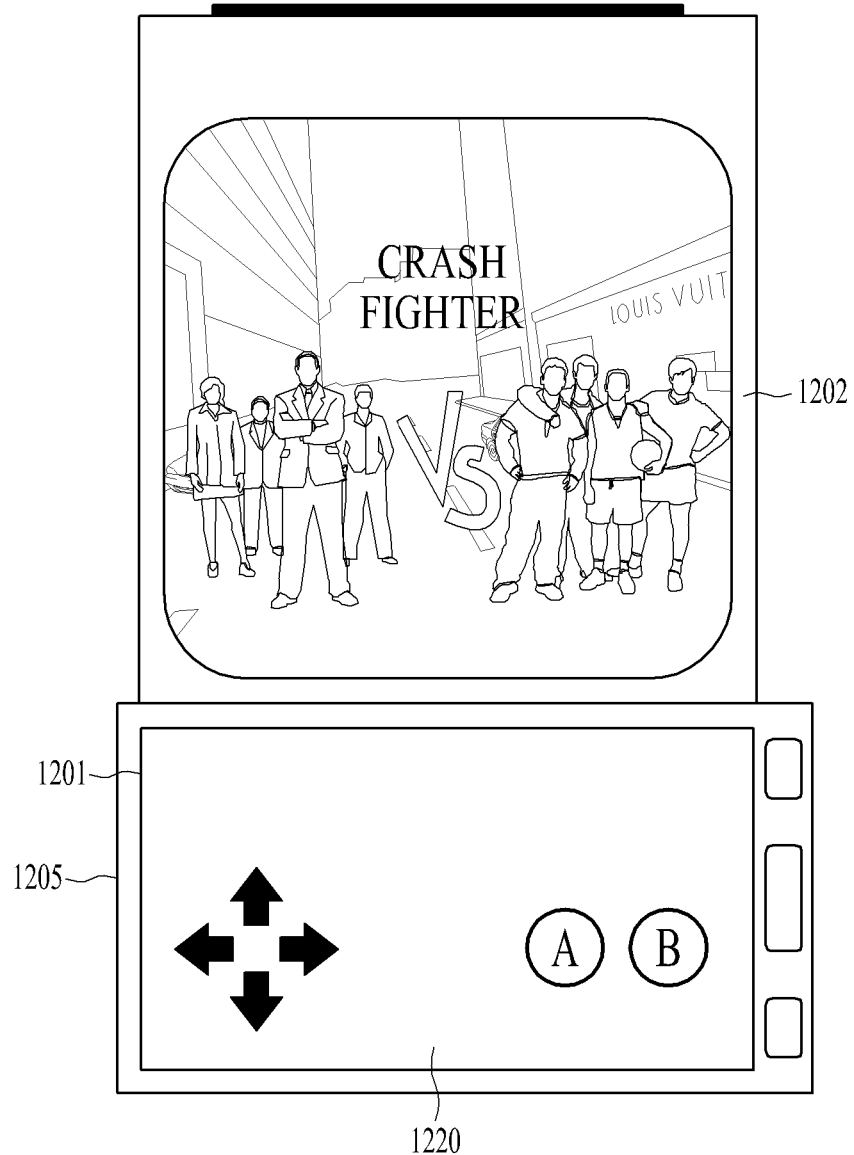
FIG. 12 illustrates an alternative user input interface, according to the present invention.

FIG. 3A illustrates the display device in the initial state where a flexible display (not illustrated) remains stored within a flexible display housing unit (not illustrated) of the display device. FIG. 3A also depicts a user input interface 320 displayed on the touch sensitive main display 301. The user input interface 320 is a visual interface that provides a user with a variety of keys for receiving the user's touch input. The user input interface 320 is exemplified in FIG. 3A as a virtual keyboard, but it is within the scope of the present invention to have different types of user input interfaces displayed in other embodiments. For example, FIG. 12 illustrates a game controller type of user input interface, to be described in detail later in this description.

The main display 301 is seen to have a width length, a. This width length, a, of the main display 301 is stored in the storage unit 120 and may be referenced by the processor 111 in various situations, as will be explained below.

Figure 3B:
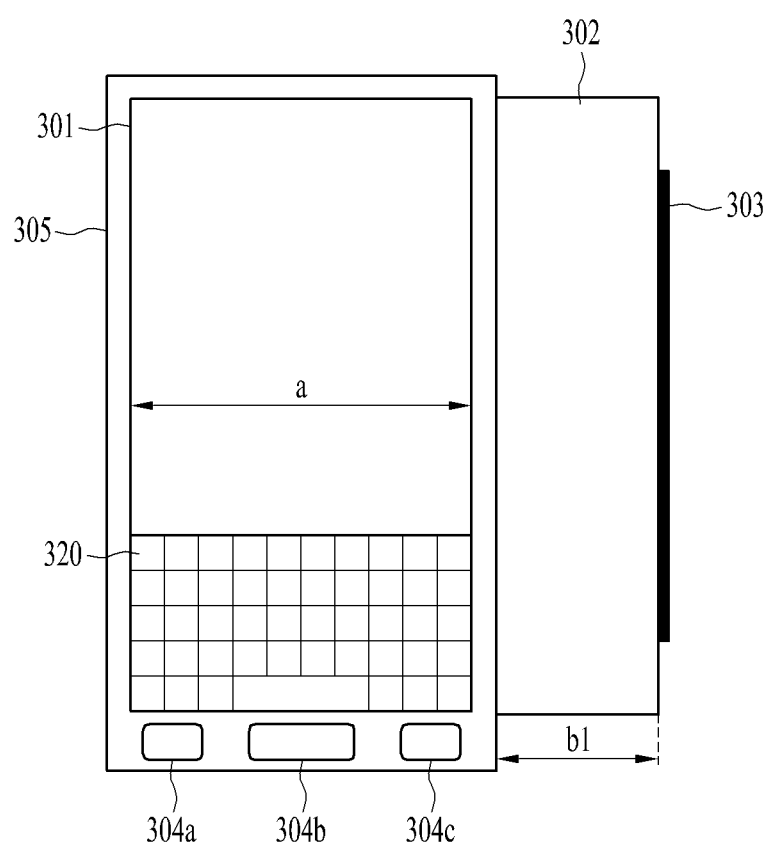
FIG. 3B illustrates a portable display device in a first state displaying a user input interface, according to the present invention.

FIG. 3B illustrates the display device in a first state where the flexible display 302 is pulled out a first length, b1, from out the flexible display housing unit (not expressly illustrated in FIGS. 3A-3K). In this first state the first length, b1, is a length that is less than the width length, a, of the main display 301 (ie. b1<a). The measuring unit 140 measures the length of the flexible display 302 that is pulled out of the flexible display housing, and transmits this first length, b1, information to the processor 111. If a touch input for attempting to transition the user input interface 320 from the main display 301 to the flexible display 302 is detected on the main display 301, the processor will compare the first length, b1, to the width length, a, of the main display 301. In the first state illustrated by FIG. 3B, because the first length, b1, is less than the width length, a, of the main display 301, the processor 111 will not allow the display of the user input interface 320 to transition from the main display 301 to the flexible display 302.

Figure 3C:
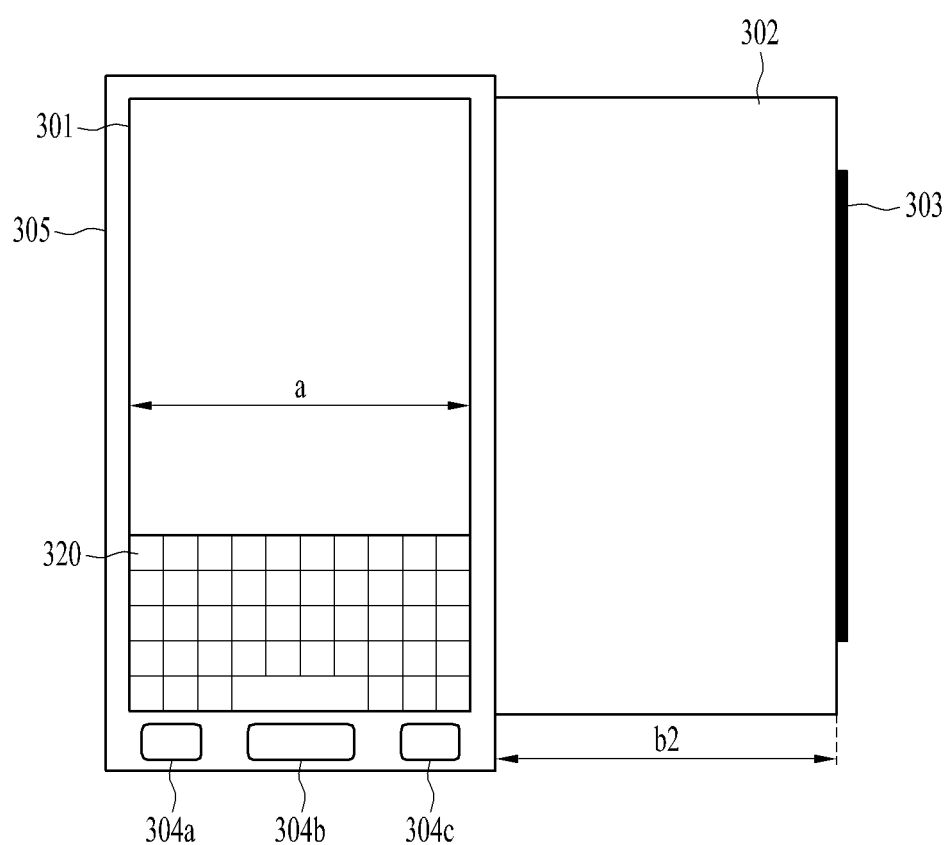
FIG. 3C illustrates a portable display device in a second state displaying a user input interface, according to the present invention.
Figure 3D:
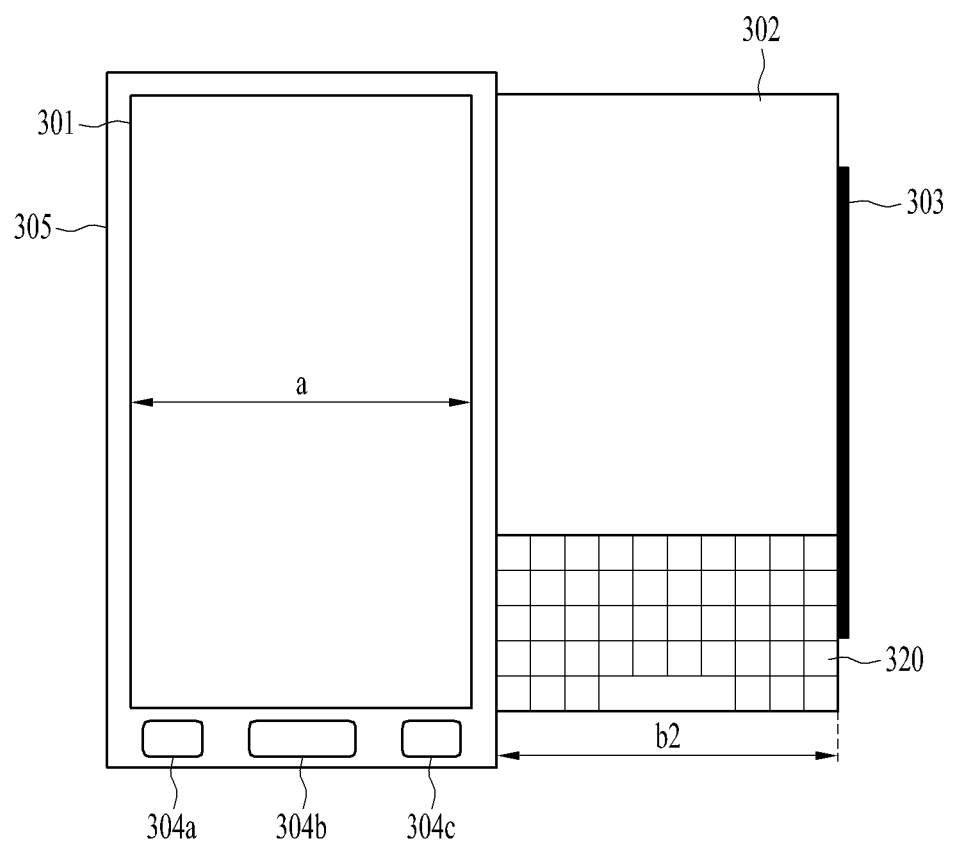
FIG. 3D illustrates a portable display device in a second state displaying an alternative display of a user input interface, according to the present invention.
Figure 3E:
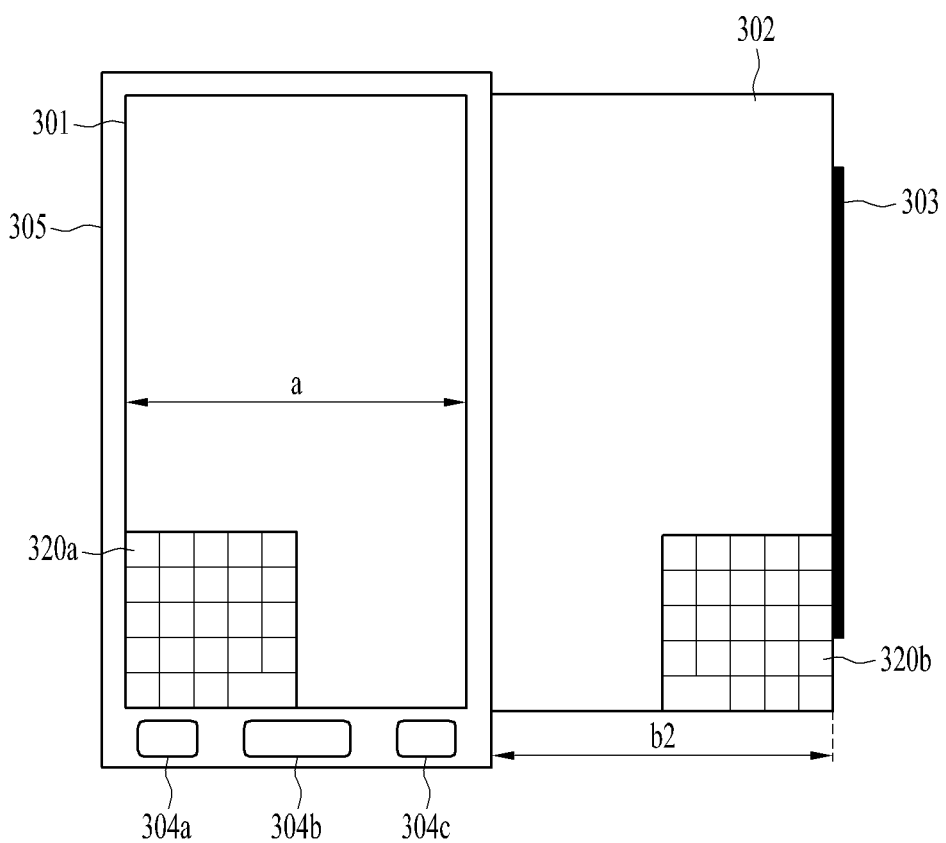
FIG. 3E illustrates a portable display device in a second state displaying an alternative display of a user input interface, according to the present invention.

FIGS. 3C-3E illustrates the display device in a second state where the flexible display 302 is pulled out a second length, b2, from out the flexible display housing unit. In this second state the second length, b2, is a length that is equal to the width length, a, of the main display 301 (ie. b2=a). The measuring unit 140 measures the length of the flexible display 302 that that is pulled out of the flexible display housing unit, and transmits this second length, b2, information to the processor 111. If a touch input for attempting to transition the user input interface 320 from the main display 301 to the flexible display 302 is detected on the main display 301, the processor will compare the second length, b2, to the length that corresponds to the width length, a, of the main display 301. In this second state, because the second length, b2, is equal to the width length, a, of the main display 301, the processor will allow the display of the user input interface 320 to transition from the main display 301 to the flexible display 302.

FIG. 3D then illustrates the user input interface 320 having been transitioned from the main display 301 and onto the flexible display 302 when the second length, b2 is at least equal to the width length, a, of the main display 301. Although FIG. 3D depicts the same user input interface 320 transitioned onto the flexible display 302, the transition of the user input interface 320 from the main display 301 to the flexible display 302 may cause a new user input interface to be displayed on the flexible display 302. The new user input interface (not illustrated) may include a keyboard with a new set of keys compared to the user input interface 320 displayed on the main display 301.

According to some embodiments of the present invention, a touch input for attempting to transition the user input interface 320 from the main display 301 to the flexible display 302, in the second state, may comprise a touch input that maintains a contact from a first contact point on the main display 301 to a second contact point on the main display 301. Preferably, the first contact point and the second contact point are located at positions on the main display 301 that overlap the display of the user input interface 320. For example the second contact point may be located at a position that is closer towards the flexible display 302 in relation to the first contact point. In this way, the touch input that maintains a contact from the first contact point to the second contact point may generally be seen as a swipe gesture on the main display 301 in the same direction as the pulling out of the flexible display 302.

According to other embodiments, the touch input for attempting to transition the user input interface 320 from the main display 301 to the flexible display 302 may comprise a touch input that maintains a contact from a first contact point on the main display 301 to a second contact point on the flexible display 302. Preferably, the first contact point is located at a position on the main display 301 that overlaps the display of the user input interface 320. Further, the second contact point may be located at a position on the flexible display 302 that is within an area where the user input interface 320 will be transitioned onto.

For any one of the touch inputs described above, the contact that is maintained from the first contact point to the second contact point may be required to be accomplished within a predetermined amount of time. The predetermined amount of time may be pre-stored on the storage unit 120, and may also be updateable at a later time by the user.

In addition, during this second state it is not only possible for a user to transition the user input interface 320 onto the flexible display 302, but it is also possible to split the display of the user input interface 320 into a first half 320a and a second half 320b. The split user input interface is depicted in FIG. 3E. To accomplish this split, a different touch input is required from the touch input described for simply transitioning the user input interface 320 from the main display 301 to the flexible display 302. A touch input for splitting the user input interface 320 into the first half 320a and the second half 320b may be described as follows.

According to some embodiments of the present invention where the user input interface 320 is initially displayed on the main display 301, a touch input for splitting the user input interface 320 into the first half 320a and the second half 320b may comprise a first contact and a second contact on the main display 301. Preferably, the first contact is maintained at a first contact point on the main display 301 while the second contact is a swiping gesture on the main display 301 starting at a second contact point and ending at a third contact point on the main display 301. In a sense, the first contact can be thought of as an "anchor" for holding the user input interface 320, and the second contact can be thought of as a gesture for "splitting apart" the user input interface 320. Preferably, all of the first, second and third contact points are located at positions that overlap the display of the user input interface 320 on the main display 301. Further, the first contact point may be located on a left half portion of the user input interface 320 on the main display 320, and the second and third contact points may be located on a right half portion of the user input interface 320 on the main display 320. Because the user input interface 320 is initially displayed on the main display 301, it is preferable that the swiping gesture of the second contact is directed towards the flexible display 302. Therefore, the third contact point of the second contact is preferably closer to the flexible display 302 than the second contact point. Alternatively, the third point may be located on the flexible display 302.

Conversely, according to other embodiments where the user input interface 320 is initially displayed on the flexible display 302, a touch input for splitting the user input interface 320 into the first half 320a and the second half 320b may comprise a first contact and a second contact on the flexible display 302. Preferably, the first contact is maintained at a first contact point on the flexible display 302 while the second contact is a swiping gesture on the flexible display 302 starting at a second contact point and ending at a third contact point on the flexible display 302. Preferably, all of the first, second and third contact points are located at positions that overlap the display of the user input interface 320 on the flexible display 302. Further, the first contact point may be located on a right half portion of the user input interface 320 on the flexible display 302, and the second and third contact points may be located on a left half portion of the user input interface 320 on the flexible display 302. Because the user input interface is initially displayed on the flexible display 302, it is preferable that the swiping gesture of the second contact is directed towards the main display 301. Therefore, the third contact point of the second contact is preferably closer to the main display 301 than the second contact point. Alternatively, the third contact point may be located on the main display 301.

According to some embodiments, the swiping gesture of the second contact that maintains contact with either one of the touch sensitive main display 301 or the flexible display 302 from the second contact point to the third contact point may be required to be accomplished within a predetermined amount of time. The predetermined amount of time may be pre-stored on the storage unit 120, and may also be updateable at a later time by the user.

Figure 3F:
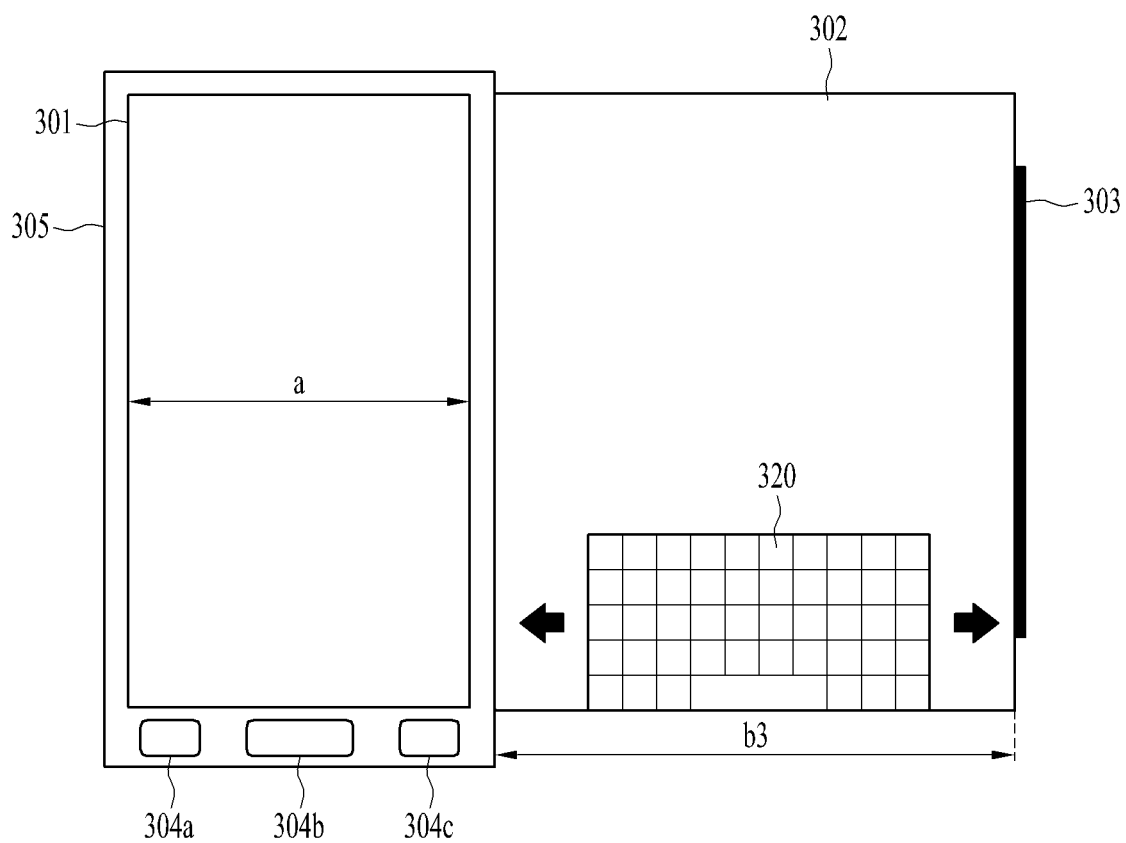
FIG. 3F illustrates a portable display device in a third state displaying a user input interface, according to the present invention.
Figure 3G:
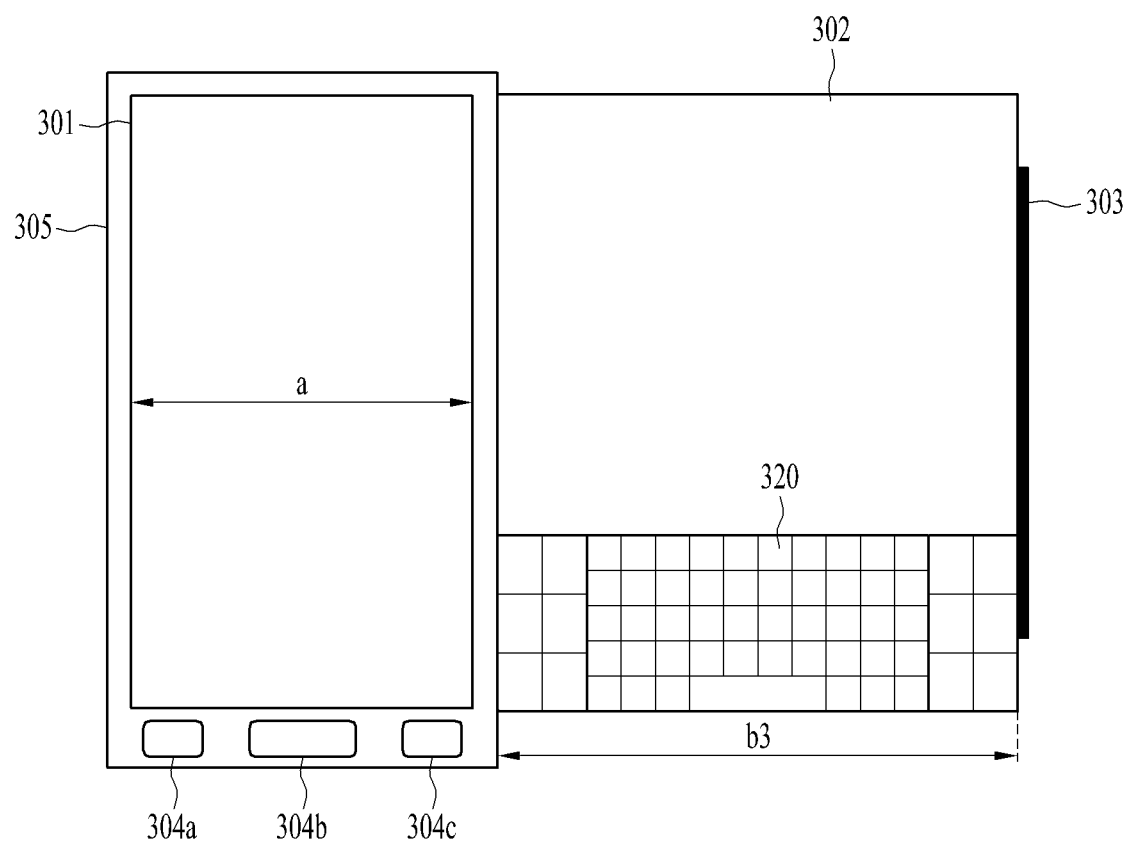
FIG. 3G illustrates a portable display device in a third state displaying an enhanced user input interface, according to the present invention.
Figure 3H:
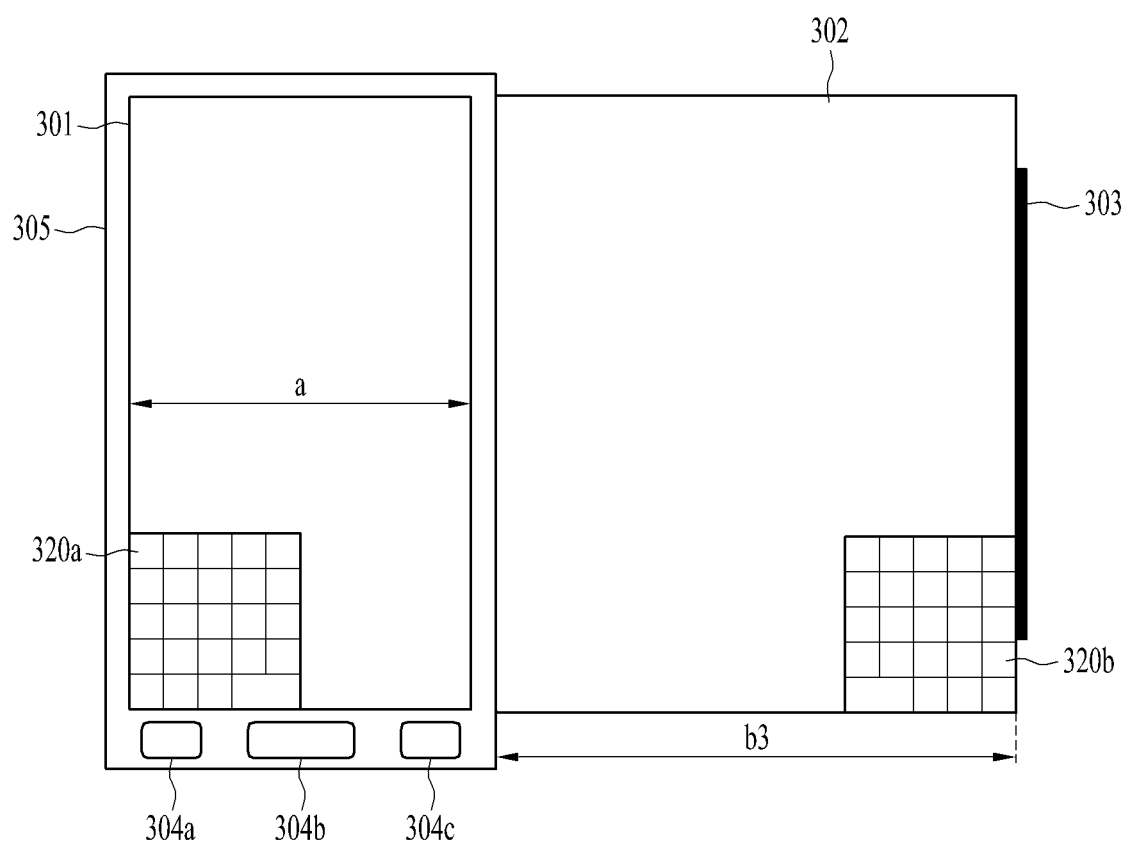
FIG. 3H illustrates a portable display device in a third state displaying an alternative display of a user input interface, according to the present invention.

FIGS. 3F-3H illustrates the display device in a third state where the flexible display 302 is pulled out a third length, b3, from out the flexible display housing unit. In this third state the third length, b3, is a length that is greater than the width length, a, of the main display 301 (ie. b3>a). The measuring unit 140 measures the length of the flexible display 302 that is pulled out of the flexible display housing, and transmits this third length, b3, information to the processor 111. If a touch input for attempting to transition the user input interface 320 from the main display 301 to the flexible display 302 is detected on the main display 301, the processor will compare the third length, b3, to the length that corresponds to the width length, a, of the main display 301. In this third state, because the third length, b3, is greater than the width length, a, of the main display 301, the processor will allow the display of the user input interface 320 to transition from the main display 301 to the flexible display 302.

According to some embodiments of the present invention, a touch input for attempting to transition the user input interface 320 from the main display 301 to the flexible display 302, in the third state, may comprise a touch input that maintains a contact from a first contact point on the main display 301 to a second contact point on the main display 301. Preferably, the first contact point and the second contact point are located at positions on the main display that overlap the display of the user input interface 320. For example the second contact point may be located at a position that is closer towards the flexible display 302 in relation to the first contact point. In this way, the touch input that maintains a contact from the first contact point to the second contact point may generally be seen as a swipe gesture on the main display 301 in the same direction as the pulling out of the flexible display 302.

According to other embodiments, the touch input for attempting to transition the user input interface 320 from the main display 301 to the flexible display 302 may comprise a touch input that maintains a contact from a first contact point on the main display 301 to a second contact point on the flexible display 302. Preferably, the first contact point is located at a position on the main display 301 that overlaps the display of the user input interface 320. Further, the second contact point may be located at a position on the flexible display 302 that is within an area where the user input interface 320 will be transitioned onto.

According to other embodiments, for any one of the touch inputs described above, the contact from the first contact point to the second contact point may be required to be accomplished within a predetermined amount of time. The predetermined amount of time may be pre-stored on the storage unit 120, and may also be updateable at a later time by the user.

FIG. 3F illustrates the user input interface 320 having already been transitioned from the main display 301 and onto the flexible display 302. Because in this third state the third length, b3, of the flexible display 302 is greater than the width length, a, of the main display, a user may touch the flexible display 302 to slide the positioning of the user input interface 320 on the flexible display 302. For instance, a touch input that maintains a contact from a first contact point to a second contact point on the flexible display 302 may slide the display of the user input interface 320 horizontally along the bottom of the flexible display 302, as depicted by the arrows illustrated in FIG. 3F. Preferably, the first contact point and the second contact point overlap the display of the user input interface 320 on the flexible display 302. For instance, if the user wishes to move the user input interface 320 to the right, the second contact point will be located to the right of the first contact point. And if the user wishes to move the user input interface 320 to the left, the second contact point will be located to the left of the first contact point.

Although FIG. 3F depicts the same user input interface 320 that is displayed on the main display 301 being transitioned to be displayed on the flexible display 302, FIG. 3G illustrates that it is also an option to display a new user input interface 320' on the flexible display 302 in response to the transition. The new user input interface 320' displayed on the flexible display 302 may include additional keys in addition to the original keys of the user input interface 320 seen on the main display 301. Alternatively, it is possible that the new user input interface 320' may be a keyboard with a completely new set of keys. Any new keyboard layout that comprises the new input interface 320' may be pre-stored in the storage unit 120 of the display device.

In addition, during this third state it is not only possible for a user to transition the user input interface 320 onto the flexible display 302, but it is also possible to split the display of the user input interface 320 into a first half 320a and a second half 320b. The split user input interface is depicted in FIG. 3H. To accomplish this split, a different touch input is required from the touch input described for simply transitioning the user input interface 320 from the main display 301 to the flexible display 302. A touch input for splitting the user input interface 320 into the first half 320a and the second half 320b may be described as follows.

According to some embodiments of the present invention where the user input interface 320 is initially displayed on the main display 301, a touch input for splitting the user input interface 320 into the first half 320a and the second half 320b may comprise a first contact and a second contact on the main display 301. Preferably, the first contact is maintained at a first contact point on the main display 301 while the second contact is a swiping gesture on the main display 301 starting at a second contact point and ending at a third contact point on the main display 301. In a sense, the first contact can be thought of as an "anchor" for holding the user input interface 320, and the second contact can be thought of as a gesture for "splitting apart" the user input interface 320. Preferably, all of the first, second and third contact points are located at positions that overlap the display of the user input interface 320 on the main display 301. Further, the first contact point may be located on a left half portion of the user input interface 320 on the main display 320, and the second and third contact points may be located on a right half portion of the user input interface 320 on the main display 320. Because the user input interface 320 is initially displayed on the main display 301, it is preferable that the swiping gesture of the second contact is directed towards the flexible display 302. Therefore, the third contact point of the second contact is preferably closer to the flexible display 302 than the second contact point. Alternatively, the third point may be located on the flexible display 302.

Conversely, according to other embodiments where the user input interface 320 is initially displayed on the flexible display 302, a touch input for splitting the user input interface 320 into the first half 320a and the second half 320b may comprise a first contact and a second contact on the flexible display 302. Preferably, the first contact is maintained at a first contact point on the flexible display 302 while the second contact is a swiping gesture on the flexible display 302 starting at a second contact point and ending at a third contact point on the flexible display 302. Preferably, all of the first, second and third contact points are located at positions that overlap the display of the user input interface 320 on the flexible display 302. Further, the first contact point may be located on a right half portion of the user input interface 320 on the flexible display 302, and the second and third contact points may be located on a left half portion of the user input interface 320 on the flexible display 302. Because the user input interface is initially displayed on the flexible display 302, it is preferable that the swiping gesture of the second contact is directed towards the main display 301. Therefore, the third contact point of the second contact is preferably closer to the main display 301 than the second contact point. Alternatively, the third contact point may be located on the main display 301.

According to some embodiments, the swiping gesture of the second contact that maintains contact with either one of the touch sensitive main display 301 or the flexible display 302 from the second contact point to the third contact point may be required to be accomplished within a predetermined amount of time. The predetermined amount of time may be pre-stored on the storage unit 120, and may also be updateable at a later time by the user.

Figure 3I:
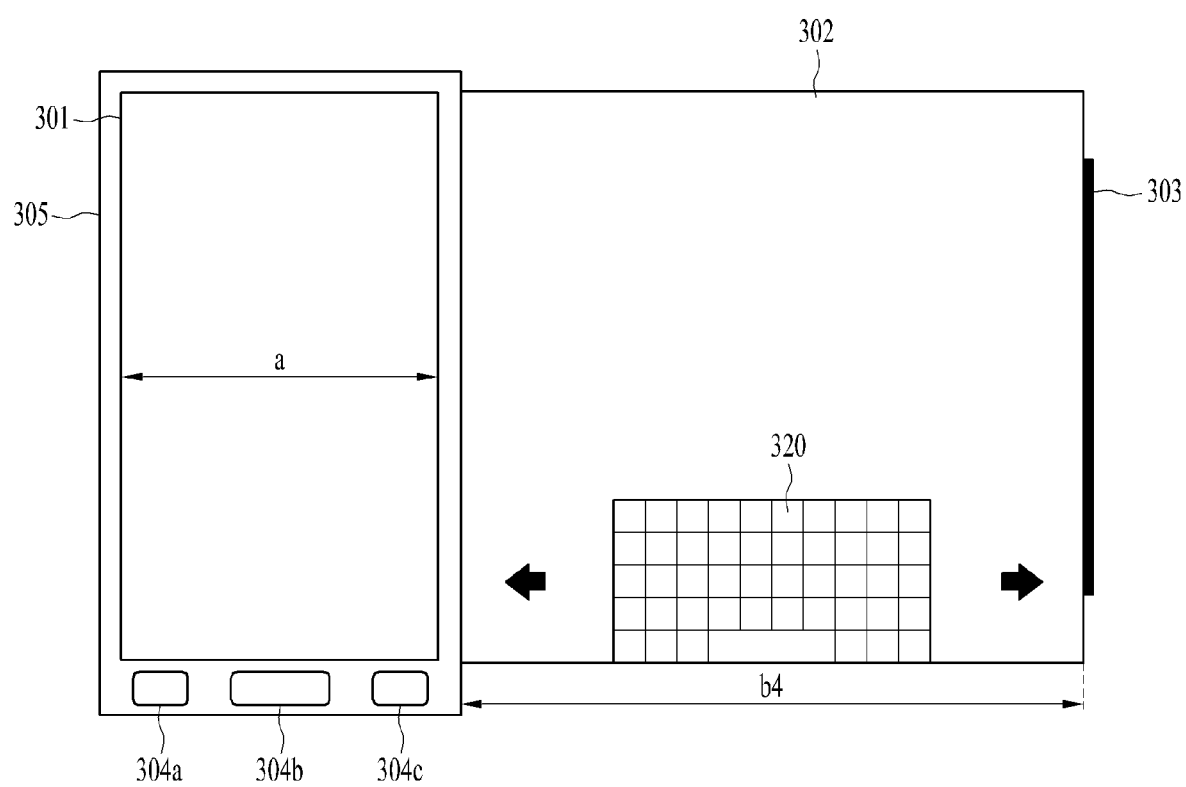
FIG. 3I illustrates a portable display device in a fourth state displaying a user input interface, according to the present invention.
Figure 3J:
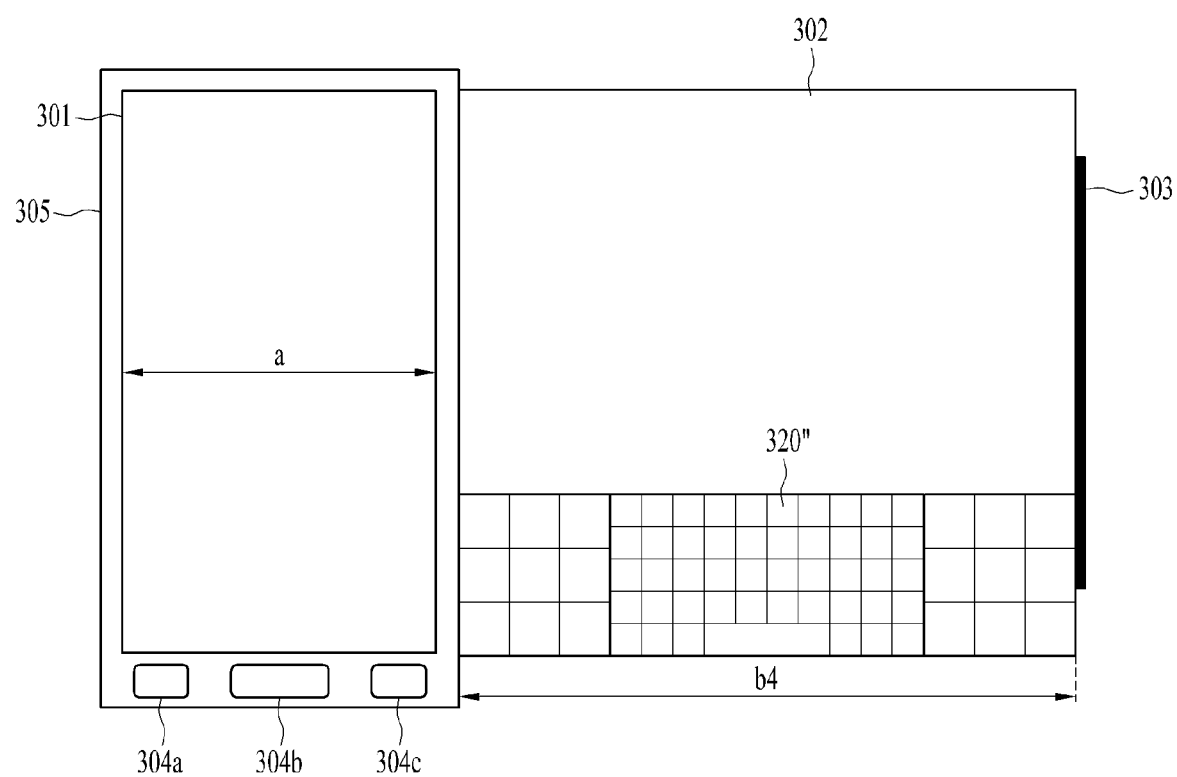
FIG. 3J illustrates a portable display device in a fourth state displaying an enhanced user input interface, according to the present invention.
Figure 3K:
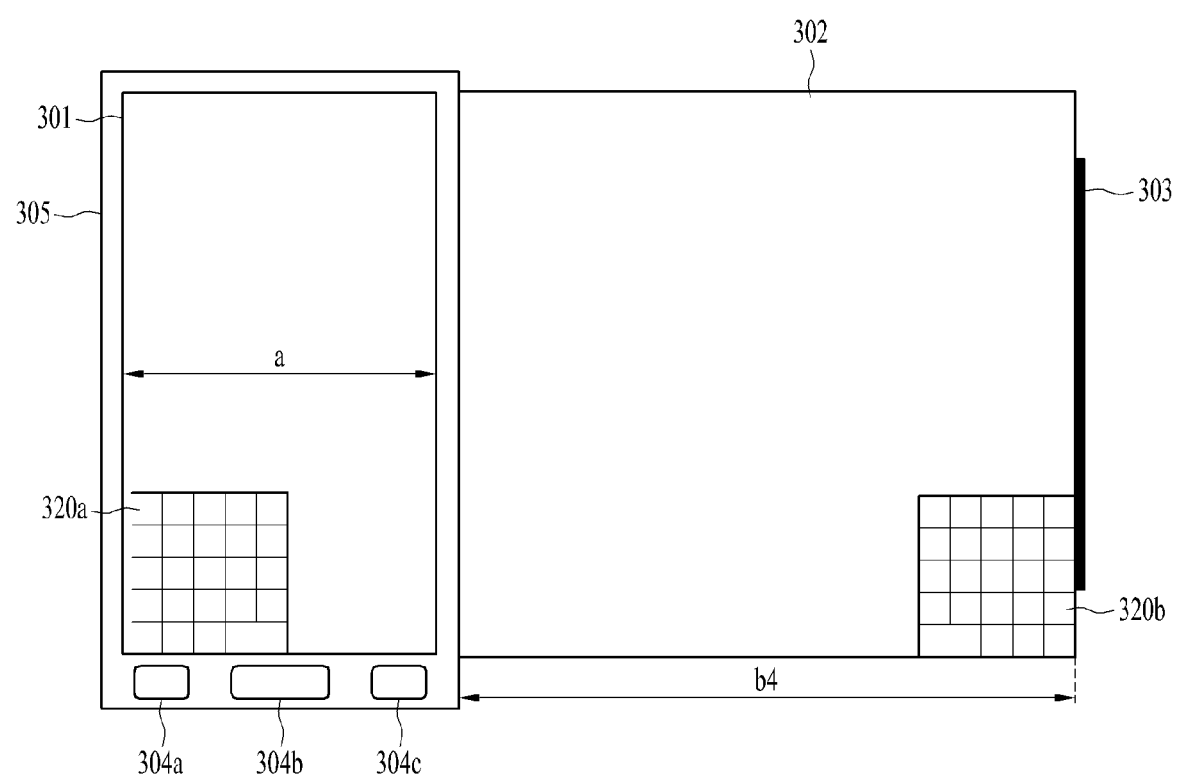
FIG. 3K illustrates a portable display device in a fourth state displaying an alternative display of a user input interface, according to the present invention.

FIGS. 3I-3K illustrates the display device in a fourth state where the flexible display 302 is pulled out a fourth length, b4, from out the flexible display housing. In this fourth state the fourth length, b4, is a length that is equal to two times the width length, 2a, of the main display 301 (ie. b4=2a). The measuring unit 140 measures the length of the flexible display 202 that is pulled out of the flexible display housing, and transmits this fourth length, b4, information to the processor 111. If a touch input for attempting to transition the user input interface 320 from the main display 301 to the flexible display 302 is detected on the main display 301, the processor will compare the fourth length, b4, to the length that corresponds to two times the width length, 2a, of the main display 301. In this fourth state, because the fourth length, b4, is equal to two times the width length, 2a, of the main display 301, the processor will allow the display of the user input interface 320 to transition from the main display 301 to the flexible display 302.

According to some embodiments of the present invention, a touch input for attempting to transition the user input interface 320 from the main display 301 to the flexible display 302, in the fourth state, may comprise a touch input that maintains a contact from a first contact point on the main display 301 to a second contact point on the main display 301. Preferably, the first contact point and the second contact point are located at positions on the main display that overlap the display of the user input interface 320. For example the second contact point may be located at a position that is closer towards the flexible display 302 in relation to the first contact point. In this way, the touch input that maintains a contact from the first contact point to the second contact point may generally be seen as a swipe gesture on the main display 301 in the same direction as the pulling out of the flexible display 302.

According to other embodiments, the touch input for attempting to transition the user input interface 320 from the main display 301 to the flexible display 302 may comprise a touch input that maintains a contact from a first contact point on the main display 301 to a second contact point on the flexible display 302. Preferably, the first contact point is located at a position on the main display 301 that overlaps the display of the user input interface 320. Further, the second contact point may be located at a position on the flexible display 302 that is within an area where the user input interface 320 will be transitioned onto.

According to other embodiments, for any one of the touch inputs described above, the contact from the first contact point to the second contact point may be required to be accomplished within a predetermined amount of time. The predetermined amount of time may be pre-stored on the storage unit 120, and may also be updateable at a later time by the user.

FIG. 3I illustrates the user input interface 320 having already been transitioned from the main display 301 and onto the flexible display 302. Because in this fourth state the fourth length, b3, of the flexible display 302 is equal to two times the width length, 2a, of the main display, a user may interact with the touch sensitive flexible display 302 to slide the positioning of the user input interface 320 displayed on the flexible display 302. For instance, a touch input that maintains a contact from a first contact point to a second contact point on the flexible display 302 may be made to slide the display of the user input interface 320 horizontally along the bottom of the flexible display 302, as depicted by the arrows illustrated in FIG. 3I. Preferably, the first contact point and the second contact point overlap the display of the user input interface 320 on the flexible display 302. For instance, if the user wishes to move the user input interface 320 to the right, the second contact point will be located to the right of the first contact point. And if the user wishes to move the user input interface 320 to the left, the second contact point will be located to the left of the first contact point.

Although FIG. 3I depicts the same user input interface 320 that is displayed on the main display 301 being transitioned to be displayed on the flexible display 302, FIG. 3J illustrates that it is also an option to display a new user input interface 320" on the flexible display 302 in response to the transition. The new user input interface 320" displayed on the flexible display 302 may include additional keys in addition to the original keys of the user input interface 320 seen on the main display 301, or the new user input interface 320" may be a keyboard with a completely new set of keys. Any new keyboard layout that comprises the new input interface 320" may be pre-stored in the storage unit 120 of the display device.

In addition, during this fourth state it is not only possible for a user to transition the user input interface 320 onto the flexible display 302, but it is also possible to split the display of the user input interface 320 into a first half 320a and a second half 320b. The split user input interface is depicted in FIG. 3K. To accomplish this split, a different touch input is required from the touch input described for simply transitioning the user input interface 320 from the main display 301 to the flexible display 302. A touch input for splitting the user input interface 320 into the first half 320a and the second half 320b may be described as follows.

According to some embodiments of the present invention where the user input interface 320 is initially displayed on the main display 301, a touch input for splitting the user input interface 320 into the first half 320a and the second half 320b may comprise a first contact and a second contact on the main display 301. Preferably, the first contact is maintained at a first contact point on the main display 301 while the second contact is a swiping gesture on the main display 301 starting at a second contact point and ending at a third contact point on the main display 301. In a sense, the first contact can be thought of as an "anchor" for holding the user input interface 320, and the second contact can be thought of as a gesture for "splitting apart" the user input interface 320. Preferably, all of the first, second and third contact points are located at positions that overlap the display of the user input interface 320 on the main display 301. Further, the first contact point may be located on a left half portion of the user input interface 320 on the main display 320, and the second and third contact points may be located on a right half portion of the user input interface 320 on the main display 320. Because the user input interface 320 is initially displayed on the main display 301, it is preferable that the swiping gesture of the second contact is directed towards the flexible display 302. Therefore, the third contact point of the second contact is preferably closer to the flexible display 302 than the second contact point. Alternatively, the third point may be located on the flexible display 302.

Conversely, according to other embodiments where the user input interface 320 is initially displayed on the flexible display 302, a touch input for splitting the user input interface 320 into the first half 320a and the second half 320b may comprise a first contact and a second contact on the flexible display 302. Preferably, the first contact is maintained at a first contact point on the flexible display 302 while the second contact is a swiping gesture on the flexible display 302 starting at a second contact point and ending at a third contact point on the flexible display 302. Preferably, all of the first, second and third contact points are located at positions that overlap the display of the user input interface 320 on the flexible display 302. Further, the first contact point may be located on a right half portion of the user input interface 320 on the flexible display 302, and the second and third contact points may be located on a left half portion of the user input interface 320 on the flexible display 302. Because the user input interface is initially displayed on the flexible display 302, it is preferable that the swiping gesture of the second contact is directed towards the main display 301. Therefore, the third contact point of the second contact is preferably closer to the main display 301 than the second contact point. Alternatively, the third contact point may be located on the main display 301.

According to some embodiments, the swiping gesture of the second contact that maintains contact with either one of the touch sensitive main display 301 or the flexible display 302 from the second contact point to the third contact point may be required to be accomplished within a predetermined amount of time. The predetermined amount of time may be pre-stored on the storage unit 120, and may also be updateable at a later time by the user.

Figure 4:
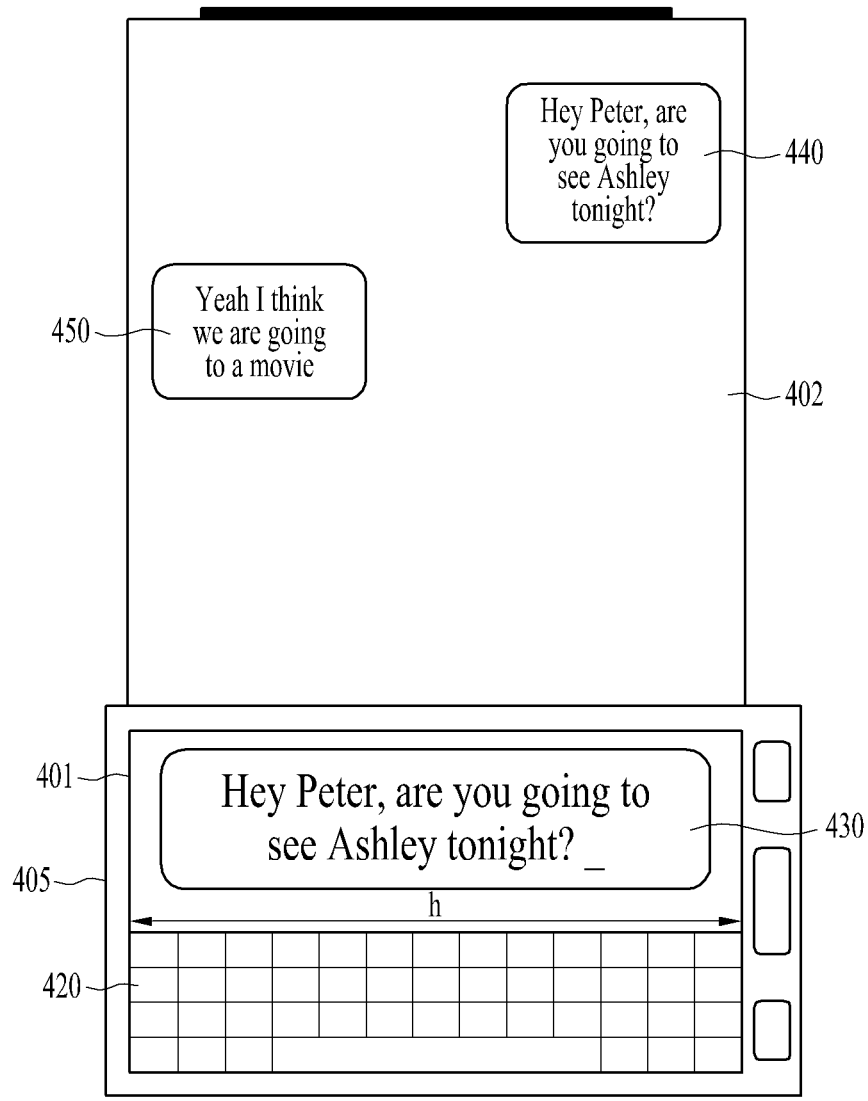
FIG. 4 illustrates a user input interface displayed on a portable display device in a landscape orientation during the execution of a first application, according to the present invention.

FIG. 4 illustrates an alternative viewing orientation for the display device. Whereas the previous description of the present invention was described with the display device in the portrait orientation, FIGS. 4-12 provide a description of the display device in the alternative landscape orientation.

For many users with larger hands, performing a typing function on a portable display device may be difficult due to the smaller size of a user input interface that is able to be displayed in the portrait orientation of the portable display device. FIG. 3A illustrates an example of a user input interface 320 that is able to be displayed on the main display 301 of the display device. It is apparent that the size of the user input interface 320 in the portrait orientation is substantially limited by the length width, a, of the main display on the display device. In fact, in the portrait orientation, the size of the user input interface 320 in one dimension is physically maxed out at the width length, a, of the main display 301. However, due to the generally rectangular shape of the main display, the width length, a, is going to be shorter than a height length of the main display. Therefore, to take advantage of this physical characteristic of the display device's main display, the present invention also takes into account various modes for operating the display device in the landscape mode. It should be noted that the physical dimensions of the display device illustrated in FIG. 3A and FIG. 4 are for all purposes of this description considered to be the same. So the main display of both display devices as illustrated in FIG. 3A and FIG. 4 have physical dimensions of width length, a, and height length, h.

So compared to the user input interface 320 that is displayed in the portrait orientation illustrated in FIG. 3A, the user input interface 420 that is displayed in the landscape orientation illustrated in FIG. 4 is able to fully utilize the longer height length, h, of the main display 401. In other words, the same user input interface 320 that was displayed in the portrait orientation will have more space to allow for larger keys when displayed in the landscape orientation. This in turns makes it easier for users to type on the display device in the landscape orientation, and in fact many users prefer to turn the display device to the landscape orientation when operating an application on the display device that requires extensive typing.

This being said, FIG. 4 depicts a two-way communication application currently being operated on the display device. The two-way communication application allows the user of the display device to communicate with a second user of a remote display device. For example the two-way communication application that is operating according to FIG. 4 may be a texting application between two cell phone users. It is noted that although only a two-way communication application has been specifically mentioned, it is within the scope of the invention that the application involves multiple users communicating in a chat room environment also.

The touch sensitive main display 401 of the display device is seen to be displaying a user input interface 420 and a typing screen 430. A user may interact with the user input interface 420 by performing touch inputs on individual keys of the user input interface 420 displayed on the main display 401. Preferably each key of the user input interface 420 corresponds to a specific letter or function related to typing, as with a conventional keyboards. Then the result of each touch input made on the user input interface 420 may be displayed on the typing screen 430 for a user to review. Typically the user's typing will not be sent to the second user until a send command key is activated.

Now because the display device of the present invention utilizes the flexible display 402 as a second display screen, the resulting conversation between the user of the display device and the second user of the remote display device may be displayed on the flexible display 402 portion. The first text window 440 corresponds to the user's text message, and the second text window 450 corresponds to the second user's text message.

This is a vast improvement over the previous display devices that did not incorporate the extendable flexible display 402, where only the main display 401 was available. In such previous display devices, all of the user input interface 420, the typing screen 430 and the resulting conversation had to be displayed on a main display. This was disadvantageous because the size of any one, or all of, the user input interface 420, typing screen 430 and resulting conversation had to be decreased in order to ensure they could all be displayed on the singular main display.

So even though a user who operated the two-way communication application in the landscape orientation could take advantage of the larger keys of a user input interface in the landscape orientation, the user still had to suffer from the smaller size of a typing screen and resulting conversation. And a user of a previous display device who operated the two-way communication application in the portrait orientation had to suffer from the smaller keys of a user input interface in the portrait orientation, but could enjoy the slightly larger size of a typing screen and resulting conversation. Essentially a user was left to choose between two uncomfortable situations, and could never fully enjoy the experience of operating the two-way communication application.

However, the present invention is able to solve the deficiency of the prior display devices by offering the flexible display 402, in addition to the main display 401. This new display device configuration allows each of the user input interface 420, typing screen 430 and the resulting conversation to have an adequate size for a user's viewing pleasure. Preferably, the user input interface 420 and the typing screen 430 may be displayed on the main display 401, and the resulting conversation may be displayed on the flexible display 402, although any combination is possible.

Figure 5:
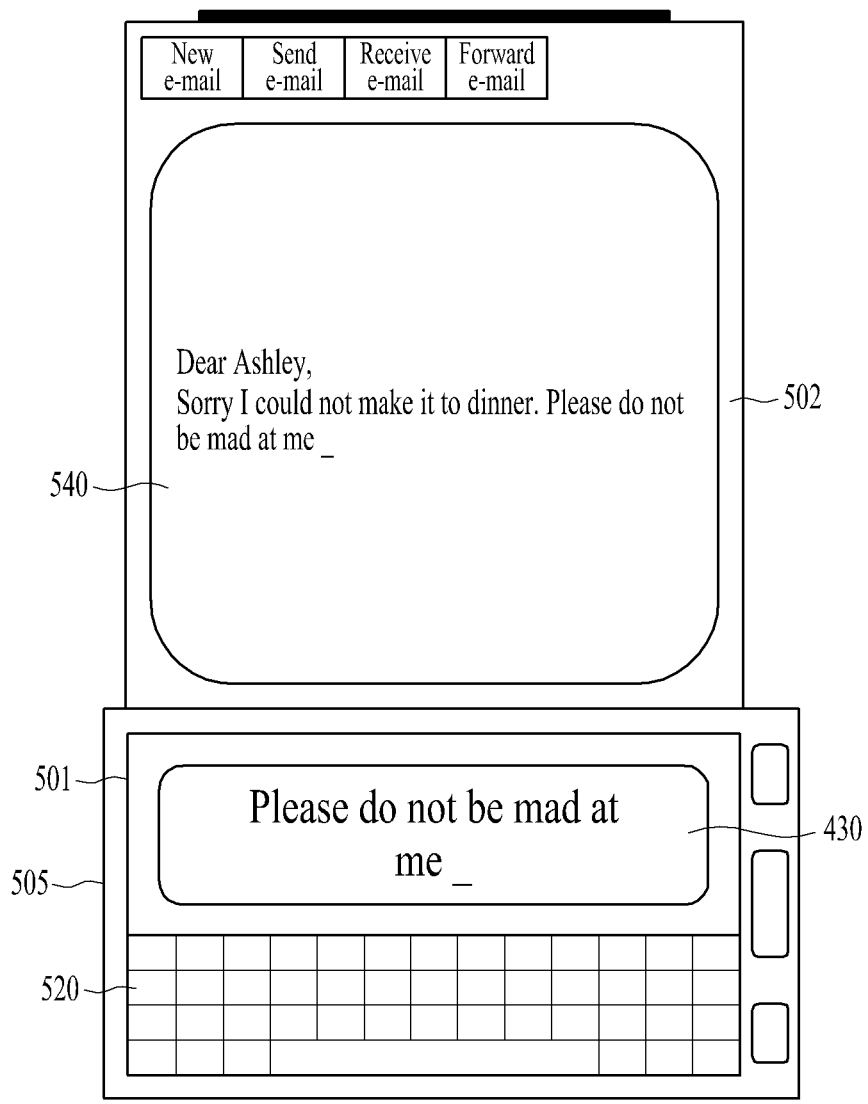
FIG. 5 illustrates a user input interface displayed on a portable display device in a landscape orientation during the execution of a second application, according to the present invention.

FIG. 5 illustrates a second typing application operating on the display device, for instance an email writing application. The email application differs from the two-way communication application described earlier because a user of the email application is the only one typing.

So in FIG. 5, there is illustrated on a touch sensitive main display 501 a user input interface 520 and a typing screen 530. A flexible display 502 is seen to be pulled out from the display device body 505, and having displayed on the flexible display 502 a typing result screen 540. The user types on the user input interface 530 by contacting the main display 501 at points that overlap specific keys of the user input interface 530, and the resulting entire text will be added to the typing result screen 540. The typing screen 530 may display a last x number of words or letters that the user has typed.

Figure 6:
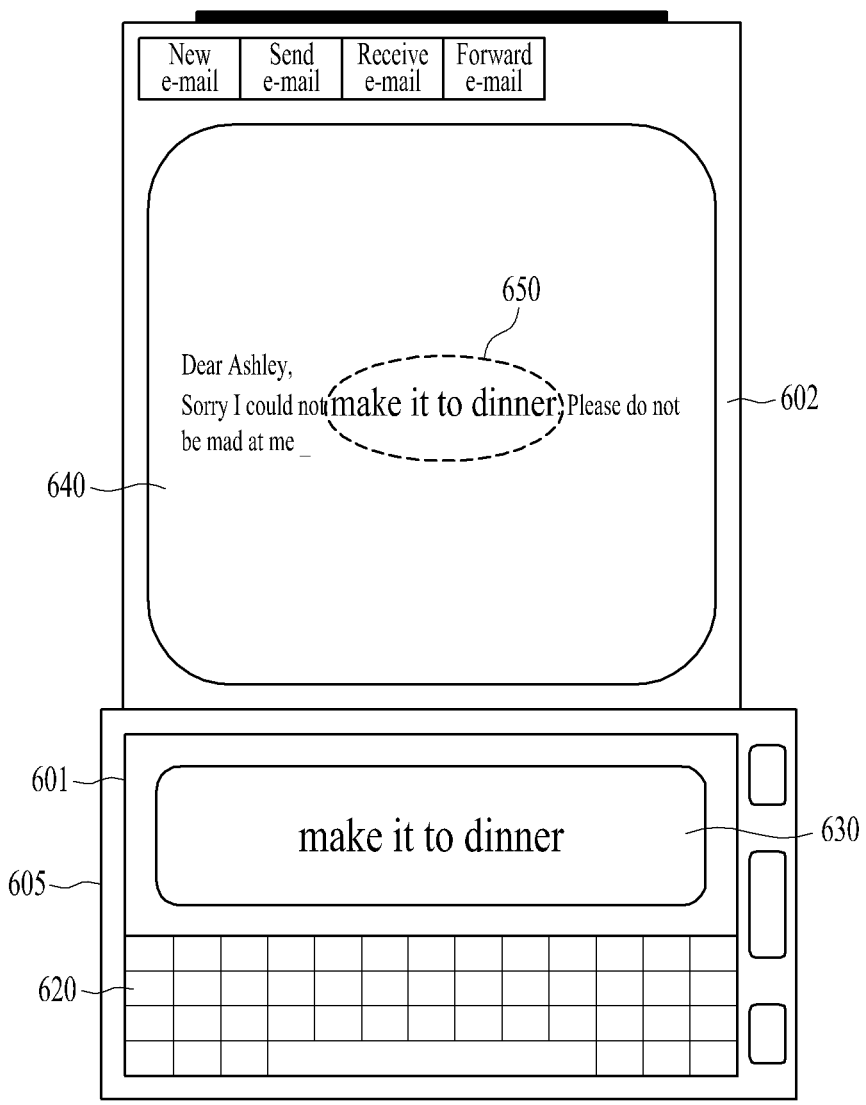
FIG. 6 illustrates a user input interface displayed on a portable display device in a landscape orientation during the execution of an editing application, according to the present invention.

FIG. 6 illustrates a text editing function being implemented for going back to fix text that has already been written. The layout of the display device in FIG. 6 is much like that seen in FIG. 5. So in FIG. 6, there is illustrated on a touch sensitive main display 601 a user input interface 620 and a typing screen 630. A flexible display 602 is seen to be pulled out from the display device body 605, and having displayed on the flexible display 602 a typing result screen 640. The user types touch inputs on the user input interface 630, and the resulting entire text will be added to the typing result screen 640, whereas normally the typing screen 630 may display a last x number of words or letters that the user has typed. However in FIG. 6 the user has initiated a text editing function by contacting a specific point on the touch sensitive flexible display 602 that contains previously written text that the user wishes to edit.

By contacting the specific point on the flexible display 602, the processor 111 will estimate an intended editing area 650 on the flexible display 602. The estimated editing area 650 may be based on some sort of measurement. For instance the processor may estimate the intended editing area 650 to be an area that encompasses text within an x number of centimeters, inches or pixels in radius from the contacted specific point on the flexible display 602 (e.g. where x is 1 inch or 2.54 cm or 6 pixels). Or the contacted specific point may correspond to a specific letter displayed on the flexible display 602, and the editing area 650 may extend to x number of letters or words preceding the specific letter and x number of letters or words following the specific letter. Regardless of the method for calculating the size of the editing area 650, the letters that are within the calculated editing area 650 is then displayed on the typing screen 630. So in FIG. 6 the words "make it to dinner" is seen to be within the editing area 650, and the same words "make it to dinner" will simultaneously be displayed in the typing screen 630 on the main display 601. This allows a user to more quickly and efficiently edit the text within the typing screen 630 on the main display 601.

Additionally, a user may contact the typing screen 630 in order to navigate the editing area 650 on the typing result screen 640. For instance, by contacting the main display 601 over the typing screen 630 with a swiping touch input gesture to the left, the text displayed within the typing screen may be transitioned to display the text "Please do not" that is positioned to the right of the previous editing area 650. In other words, the swiping touch input gesture over the typing screen 630 may be detected and recognized as a control for sheet of text that is displayed on the typing result screen 640.

Figure 7:
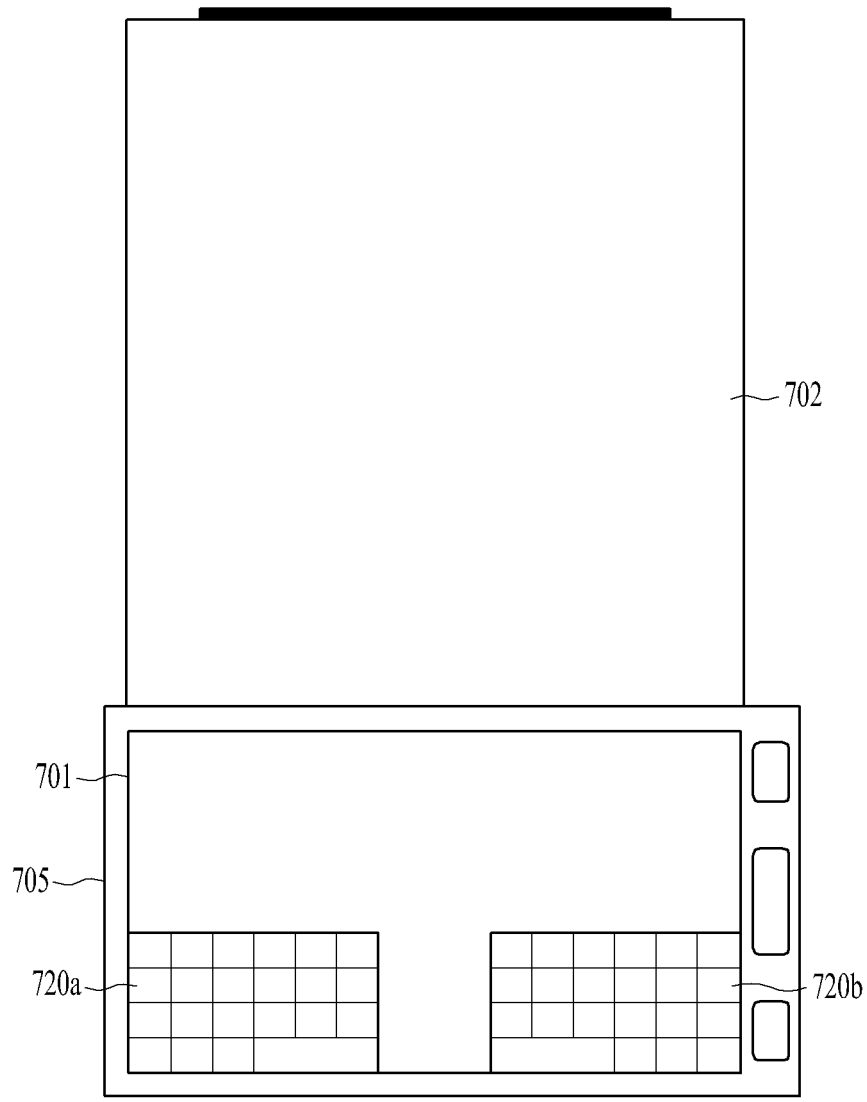
FIG. 7 illustrates an alternative user input interface displayed on a portable display device in a landscape orientation, according to the present invention.

According to the present invention, a user input interface displayed during operation of the display device while in the landscape orientation may also be split. So FIG. 7 illustrates a main display 701 displaying a user input interface that has been split into a first half 720a and a second half 720b. The touch input for splitting the user input interface displayed during operation of the display device while in the landscape orientation may be the same as described above for the embodiments of the display device while in the portrait orientation. The flexible display 702 is also seen to have been pulled out from the display device body 705.

Figure 8:
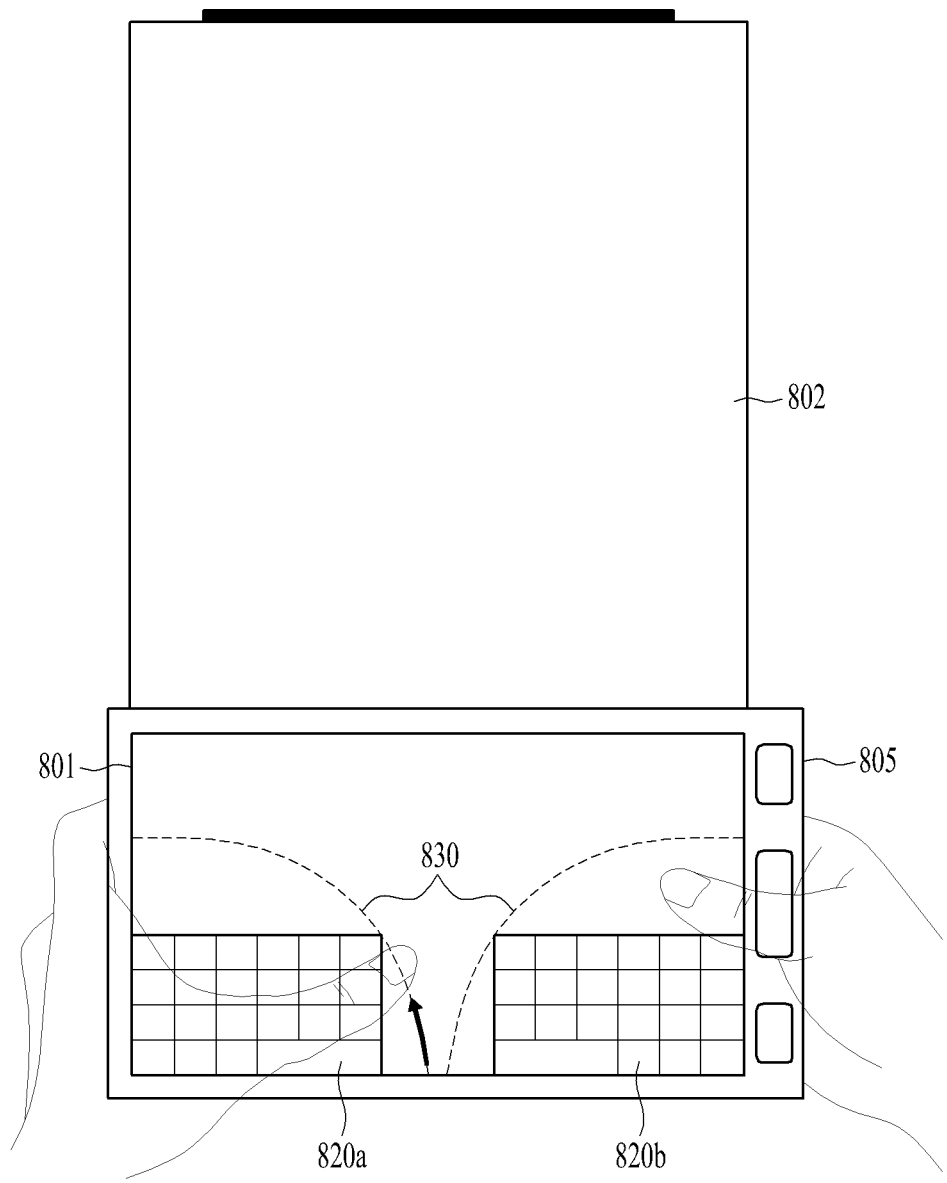
FIG. 8 illustrates a sizing technique for calculating the size of a user input interface to be displayed on a portable display device, according to the present invention.

For the split user input interface display, the display device is also able to adjust the size of the split user input interface to better compliment a user's hand size. Specifically, because a user will likely type on the split user input interface with the user's thumbs, the range of the user's thumb may be referenced by the display device to adjust the size of the split user input interface display. So FIG. 8 illustrates a user holding the display device with both hands and swiping an arc 830 at both ends of the main display 801 where a first half 820a and a second half 820a of a split user input interface are to be displayed.

When the user first splits the user input interface into the first half 820a and the second half 820b, the splitting of the user input interface may be recognized by the processor, which in turn initiates a size adjustment mode. Alternatively, the size adjustment mode may be initiated by the user directly at a later time. In any case, during the size adjustment mode the user may be first prompted to swipe a range of the user's thumb across the main display 801 while holding the display device in the landscape orientation. The resulting swipe of the user's thumbs will result in the swiping range in the shape of the arc 830 illustrated in FIG. 8.

In some embodiments, the swiping motion for a user's left thumb may begin at a bottom edge of the main display 701 and end at a left edge of the main display 701. Alternatively, the swiping motion for a user's left thumb may begin at a left edge of the main display 701 and end at a bottom edge of the main display 701. Or alternatively, the swiping motion for a user's left thumb may begin at a bottom edge of the main display 701, sweep up to the left edge of the main display 701 and end back at the bottom edge of the main display 701. Or alternatively, the swiping motion for a user's left thumb may being at a left edge of the main display 701, go down to the bottom edge of the main display 701 and end back up at the left edge of the main display 701. All references are taken from the perspective of the landscape orientation illustrated in FIG. 7. And the converse swiping motion for the user's right thumb is envisioned.

The arc 830 drawn on the main display 801 that results from the user's swiping touch input on the touch sensitive main display 801 is then registered by the processor as the range of the user's thumbs. The processor will then proceed to adjust the display of each of the first half 820a and the second half 820b of the split user input interface will reside within the arc 830. For instance the key of the first half 820a of the split user input interface that is furthest from the left edge of the main display 801 (from the landscape orientation prospective illustrated in FIG. 8) may be displayed to be just within the drawn thumb arc 830. This way the user's left hand thumb may be able to reach the key of the first half 820a that is furthest away. The same applies, conversely, for the adjusted display of the second half 820b.

Although FIG. 8 illustrates the arcs 830 to be substantially the same size, in some instances the user may draw the thumb arcs to be different in range. For these cases, the processor is able to independently adjust the size of each respective first half 820a and second half 820b to fit within their corresponding arc range drawn to their side.

Figure 9:
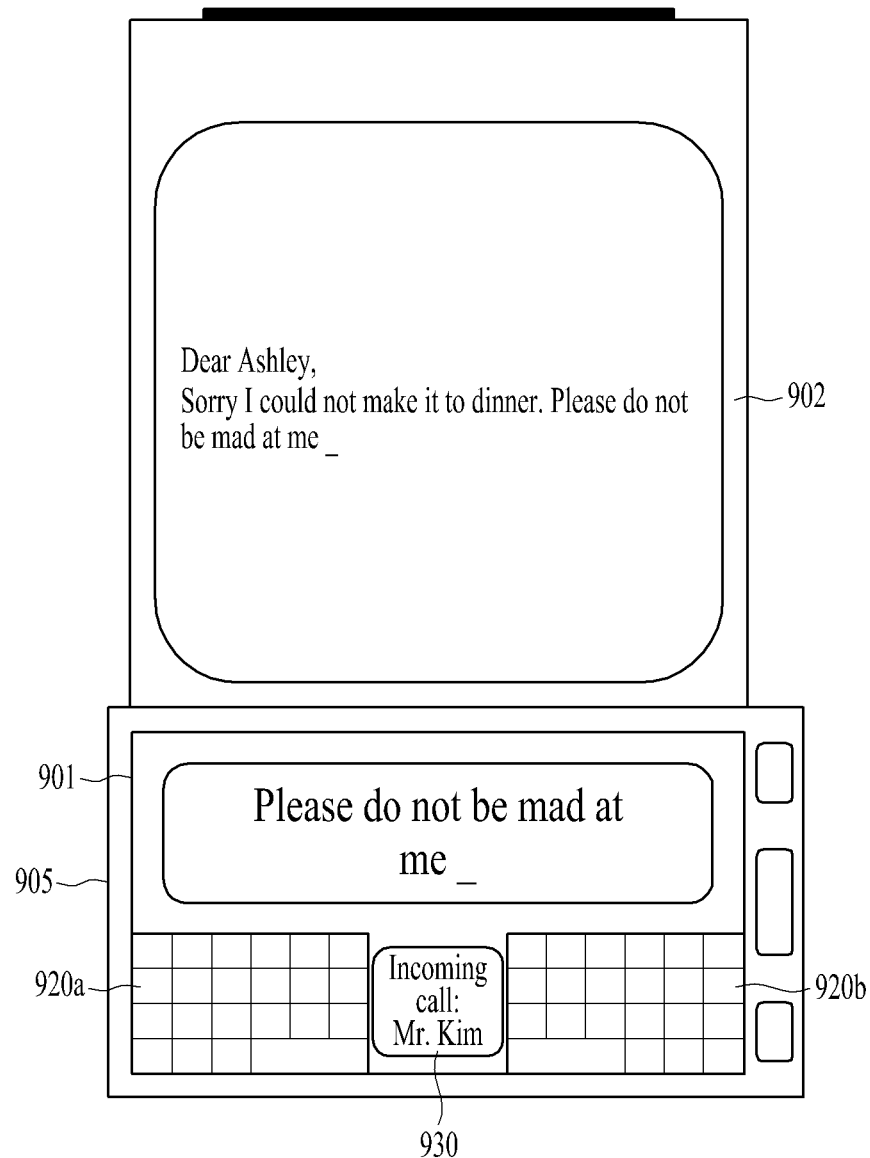
FIG. 9 illustrates an icon indicator being displayed during the use of a user input interface, according to the present invention.

FIG. 9 illustrates an instance where a user is operating a split user input interface having a first half 920a and a second half 920b, and an incoming phone call is received. When an incoming phone call event is recognized by the processor 111, a pop up window 930 may be displayed in an area that is between the first half 920a and the second half 920b on the main display 901. The user may then contact the touch sensitive main display 901 in an area that overlaps the pop up window 930 to pick up the incoming call.

Figure 10:
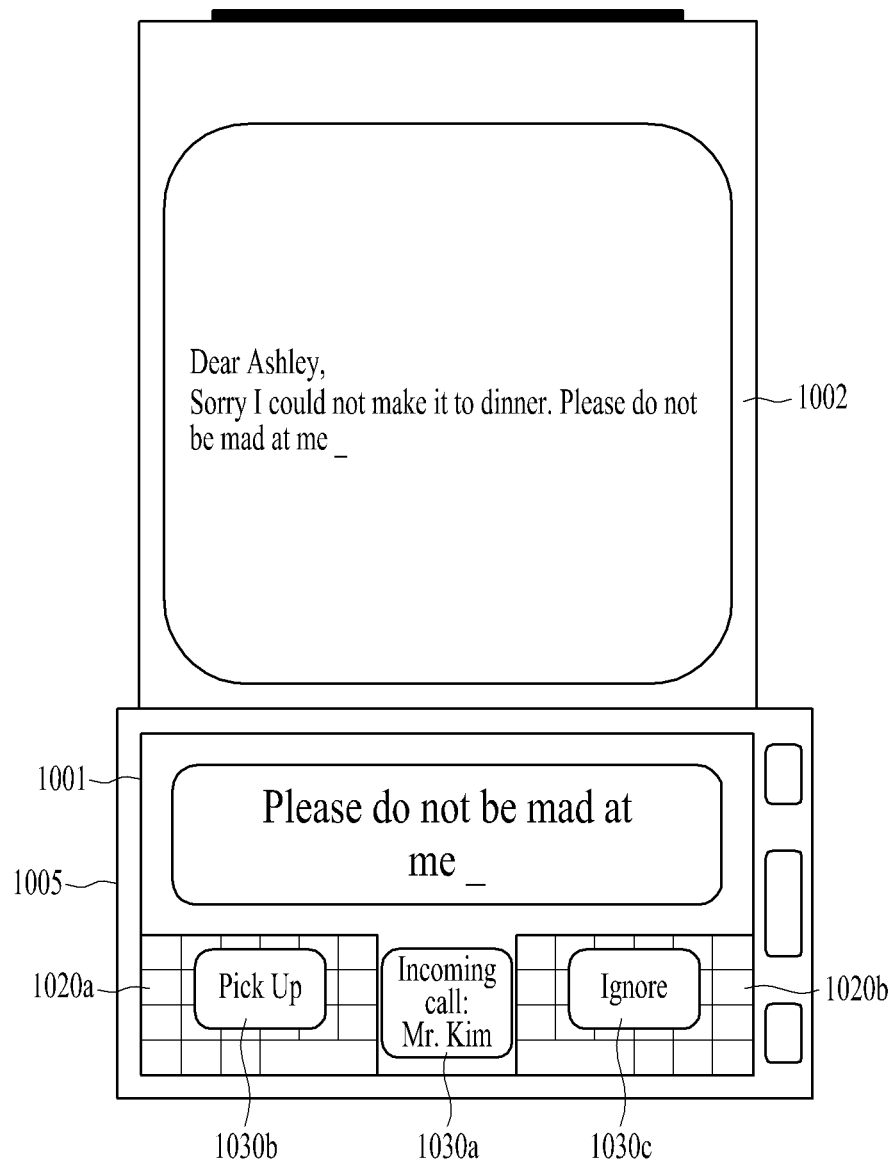
FIG. 10 illustrates an alternative icon indicator being displayed over a user input interface during the user of the user input interface, according to the present invention.

Alternatively, FIG. 10 illustrates a pop up window 1030a that indicates an incoming phone call is being received displayed in an area that is between the first half 1020a and the second half 1020b on the main display 1001. According to this embodiment, the key 1030b for picking up the incoming phone call is displayed to overlap the first half 1020a, and the key 1030c for ignoring the incoming phone call is displayed to overlap the second half 1020*b*. The keys for picking up the phone call 1030*b* and ignoring the phone call 1030*c* are displayed to be overlapping the first half 1020*a* and the second half 1020*b* of the split user input interface, respectively, because it is known then that the user's thumbs are within range to reach the keys 1030*b* and 1030*c*.

Figure 11:
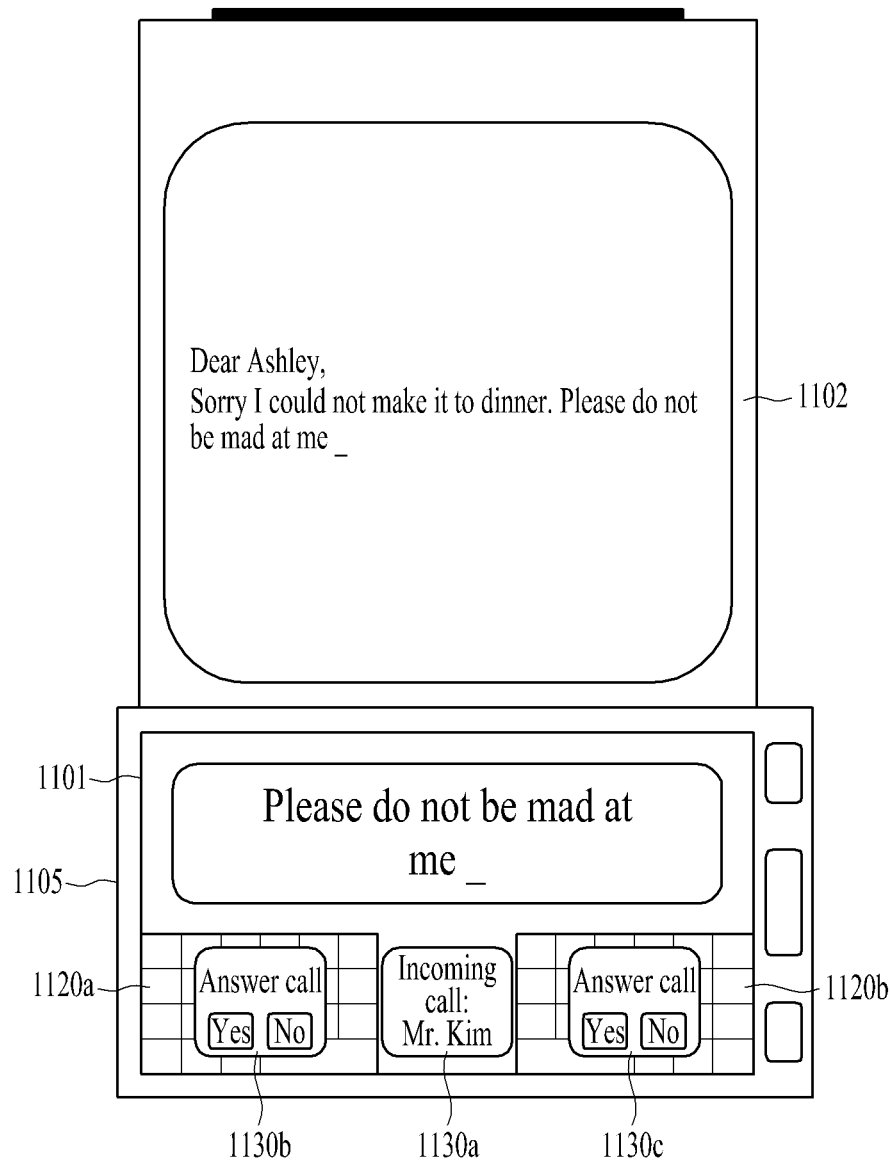
FIG. 11 illustrates an alternative icon indicator being displayed over a user input interface during the user of the user input interface, according to the present invention.

Alternatively, FIG. 11 illustrates a pop up window 1130*a* that indicates an incoming phone call is being received displayed in an area that is between the first half 1120*a* and the second half 1120*b* on the main display 1101. According to this embodiment, the first key 1130*b* displayed over the first half 1120*a* include both a button for answering the incoming phone call (Yes) and for ignoring the incoming phone call (No). Likewise, the key 1130*c* displayed over the second half 1120*b* includes both a button for answering the incoming phone call (Yes) and for ignoring the incoming phone call (No). Both key 1130*b* and key 1130*c* are displayed to be overlapping the first half 1120*a* and the second half 1120*b* of the split user input interface, respectively, because it is known then that the user's thumbs are within range to reach the keys 1130*b* and 1130*c*.

FIG. 12 is an example of an alternative user input interface 1220 that is made to replicate a video game controller 1220. The video game controller 1220 type user input interface is shown to be displayed on the main display 1201. The actual game play is controlled to be displayed on the pulled out flexible display 1202, where the flexible display is pulled out from the display device body 1205. By having the additional flexible display 1202 as a second display in addition to the main display 1201, a user of the display device may better enjoy operating game type applications on the display device of the present invention. Because previous display devices only had available a main display for displaying both a video game controller portion and the actual game play, the user experience was not optimized due to the overlapping graphics. However the display device of the present invention offers an improvement over the previous display devices because the display device of the present invention has available the flexible display 1202 that can be dedicated to displaying only the game play, therefore freeing up the main display 1201 to display the video game controller 1220. Although the components that make up the video game controller 1220 illustrated in FIG. 12 includes at least a directional portion and a control buttons portion, because the entire main display 1201 may be dedicated to displaying the video game controller portion a more detailed video game controller may be possible according to the present invention.

Figure 13:
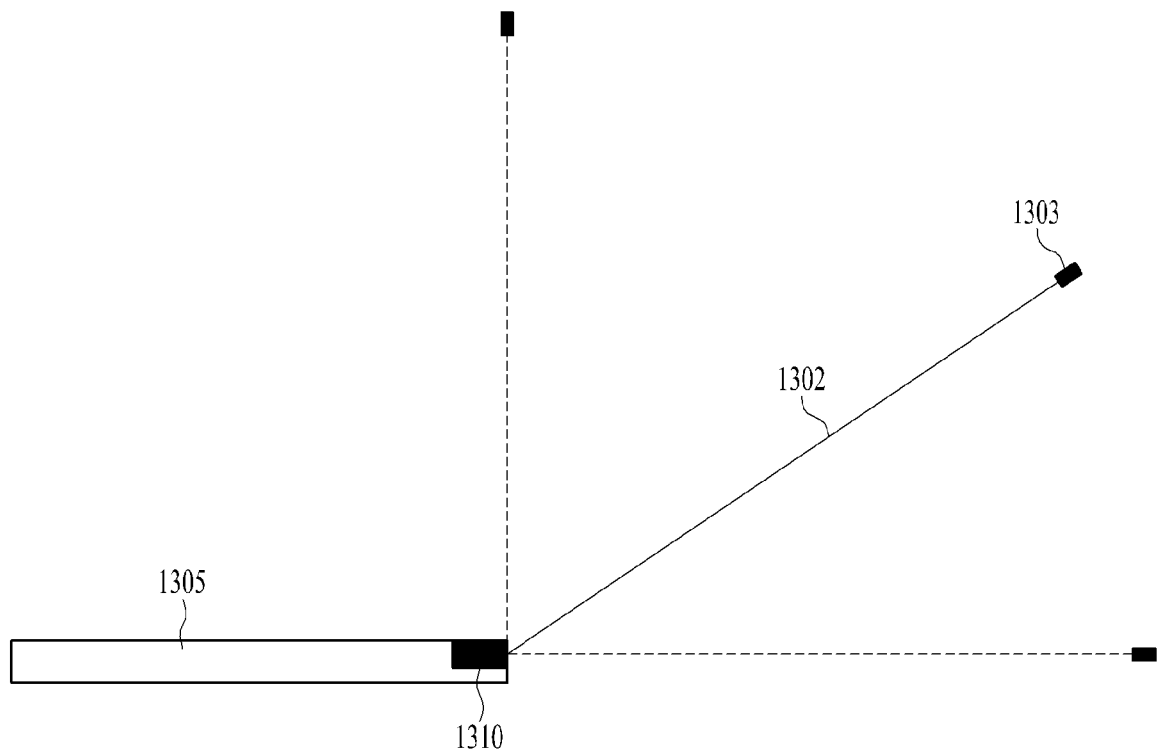
FIG. 13. Illustrates a range of flexible display settings, according to the present invention.

FIG. 13 illustrates a range of possible tilting positions for a flexible display 1302 of the present invention. Although the embodiments of the present invention described above assumed the flexible display portion 1302 to lay flat with the display device body 1305, it is within the scope of the present invention to have the flexible display 1302 tilt with respect to the display device body 1305. FIG. 13 illustrates the range of available tilting degrees for the flexible display 1302 to range from 0 degrees (laying flat) to 90 degrees. The availability of the flexible display's 1302 tilting design allows a user multiple viewing orientations, thus making the user's overall experience of using the display device of the present invention more enjoyable.

Figure 14:
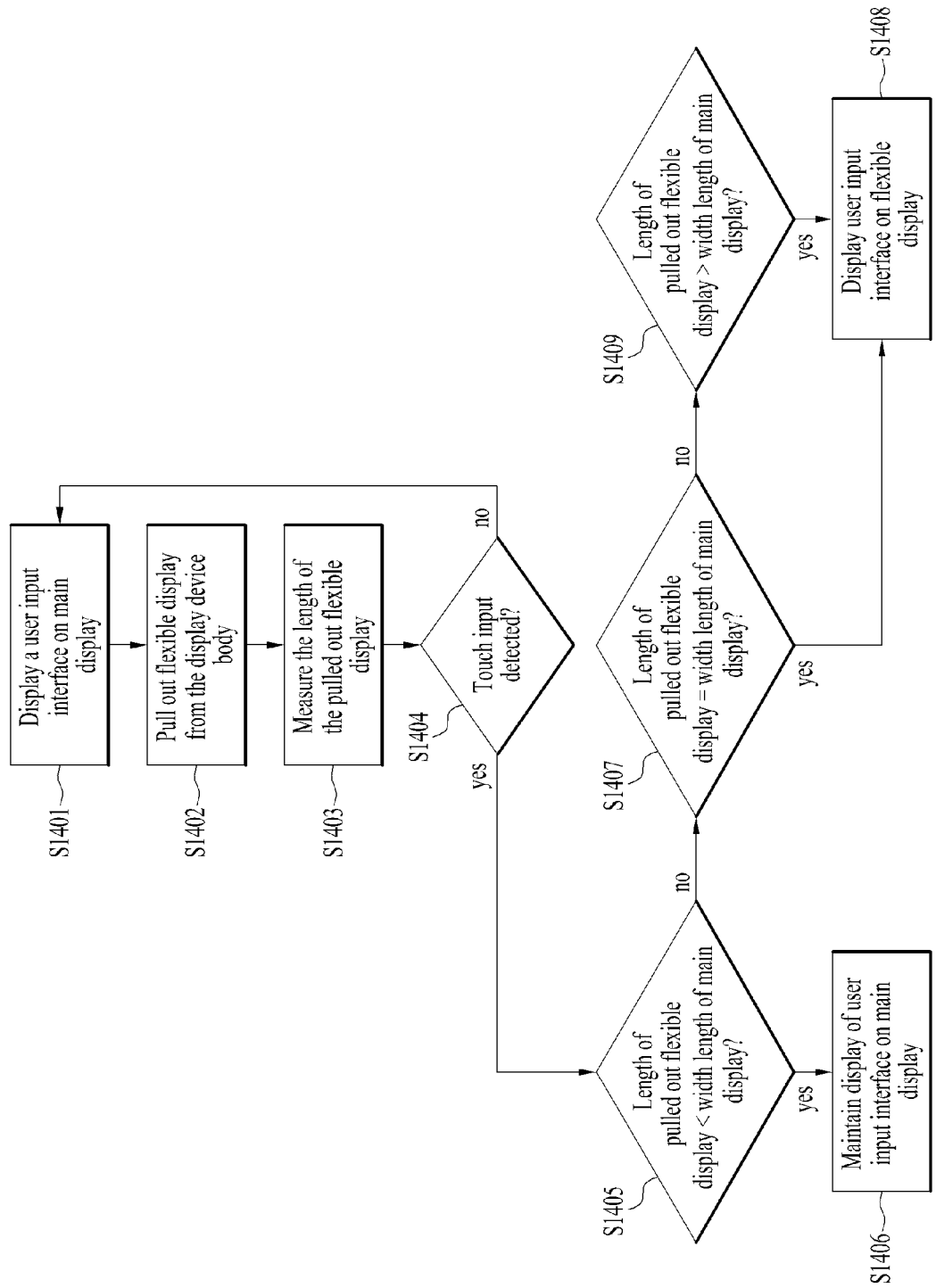
FIG. 14 illustrates a flowchart describing a sequence for controlling the display of a user input interface, according to some embodiments of the present invention.

FIG. 14 illustrates a flowchart describing a sequence according to some embodiments of the present invention.

First, a user input interface is displayed on a main display of a display device of the present invention, S1401. The main display is known to have a set width length. And as described above, the user input interface may be in the form of a keyboard or other input interface where a user may input touch inputs on the touch sensitive main display.

Then a user may begin to pull out a flexible display that is stored within a body of the display device, S1402. The flexible display is a display screen having the physical properties of being able to be significantly flexible, enough so to be considered rollable. In addition, the flexible display according may be touch sensitive, as described throughout the description.

As the user is pulling out the flexible display from the display device body, S1402, a measuring unit of the display device will measure a length of the pulled out portion of the flexible display, S1403.

A touch input may then be initiated by the user by making contact with the main display, S1404. If the touch input made by the user corresponds to a touch input for attempting to transition the user input interface to the flexible display, the process moves on to step S1405. If no touch input is detected, or the touch input is not recognized by the processor 111 as being related to a specific function or task the process simply continues to display the user input interface on the main display as before in step S1401. The various types of touch inputs that may be recognized by the processor 111 of the present invention is described in detail throughout the description.

Now if the processor 111 does recognize touch input as a touch input for attempting to transition the user input interface to the flexible display, then the process proceeds to step S1405. In step S1405, a length of the flexible display that is pulled out of the display device body is compared to the width length of the main display. If the length of the flexible display that is pulled out of the display device body is less than the width length of the main display, then the display of the user input interface is maintained on the main display, S1406.

However if the length of the flexible display that is pulled out of the display device body is not less than the width length of the main display, then in step S1407 the length of the flexible display that is pulled out of the display device body is again compared to the width length of the main display. In step S1407, if the length of the flexible display that is pulled out of the display device body is found to be equal to the width length of the main display then the processor 111 will allow the display of the user input interface to transition to the flexible display, S1408. When the user input interface is displayed on the main display, the size of the user input interface is directly limited by the width length of the main display. Therefore, the flexible display must be pulled out at least to a length that equals the width length of the main display to allow the user input interface transition onto the flexible display.

If the length of the flexible display that is pulled out of the display device body is not equal to the width length of the main display, then the process proceeds to step S1409. At step S1409, the length of the flexible display that is pulled out of the display device body is again compared to the width length of the main display to determine whether the length of the flexible display that is pulled out of the display device body is greater than the width length of the main display. If the length of the flexible display that is pulled out of the display device body is found to be greater than the width length of the main display, then the processor 111 allows the transition of the user input interface from the main display to the flexible display, S1408. It should be noted that the scenario where the length of the flexible display that is pulled out of the display device body is equal to twice the width length of the main display is encompassed by the determination made in step S1409.

Figure 15:
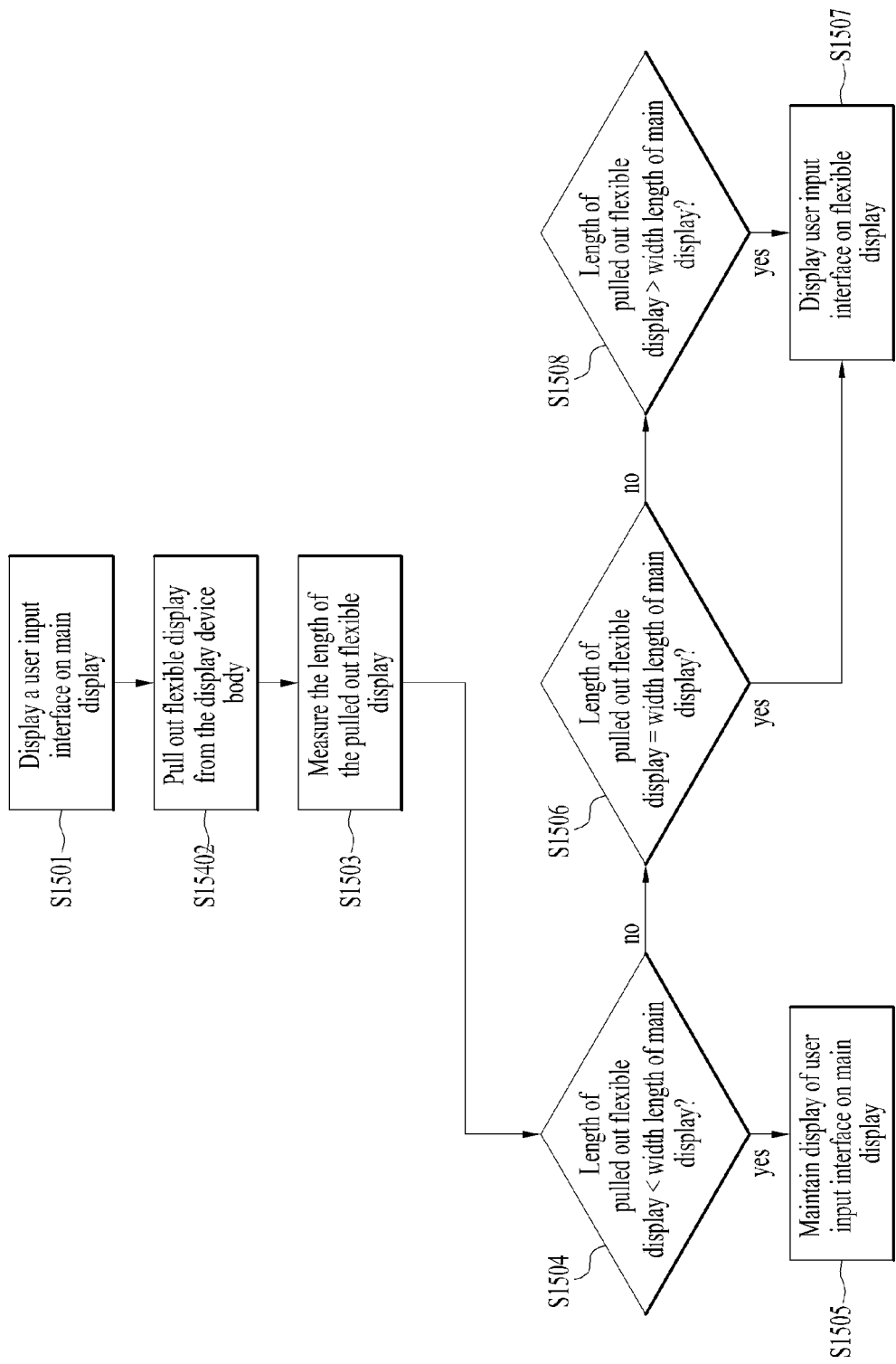
FIG. 15 illustrates a flowchart describing a sequence for controlling the display of a user input interface, according to some embodiments of the present invention.

FIG. 15 illustrates a flowchart describing a sequence according to some embodiments of the present invention. The sequence illustrated in FIG. 15 is similar to the sequence illustrated in FIG. 14, except that the sequence illustrated in FIG. 15 does not wait for a user's touch input to determined whether the transition of the user input interface from the main display to the flexible display should be allowed. Instead, according to the embodiment described by the sequence illustrated in FIG. 15 simply makes the determination of whether to allow the transition of the user input interface from the main display to the flexible display based on the measured length of the flexible display that has been pulled out of the display device body.

First, a user input interface is displayed on a main display of a display device of the present invention, S1501. The main display is known to have a set width length. And as described above, the user input interface may be in the form of a keyboard or other input interface where a user may input touch inputs on the touch sensitive main display.

Then a user may begin to pull out a flexible display that is stored within a body of the display device, S1502. The flexible display is a display screen having the physical properties of being able to be significantly flexible, enough so to be considered rollable. In addition, the flexible display according may be touch sensitive, as described throughout the description.

As the user is pulling out the flexible display from the display device body, S1502, a measuring unit of the display device will measure a length of the pulled out portion of the flexible display, S1503.

In step S1504, the length of the flexible display that is pulled out of the display device body is compared to the width length of the main display. If the length of the flexible display that is pulled out of the display device body is less than the width length of the main display, then the display of the user input interface is maintained on the main display, S1505.

However if the length of the flexible display that is pulled out of the display device body is not less than the width length of the main display, then in step S1506 the length of the flexible display that is pulled out of the display device body is again compared to the width length of the main display. In step S1506, if the length of the flexible display that is pulled out of the display device body is found to be equal to the width length of the main display then the processor 111 will allow the display of the user input interface to transition to the flexible display, S1507. When the user input interface is displayed on the main display, the size of the user input interface is directly limited by the width length of the main display. Therefore, the flexible display must be pulled out at least to a length that equals the width length of the main display to allow the user input interface transition onto the flexible display.

If the length of the flexible display that is pulled out of the display device body is not equal to the width length of the main display, then the process proceeds to step S1508. At step S1508, the length of the flexible display that is pulled out of the display device body is again compared to the width length of the main display to determine whether the length of the flexible display that is pulled out of the display device body is greater than the width length of the main display. If the length of the flexible display that is pulled out of the display device body is found to be greater than the width length of the main display, then the processor 111 allows the transition of the user input interface from the main display to the flexible display, S1507. It should be noted that the scenario where the length of the flexible display that is pulled out of the display device body is equal to twice the width length of the main display is encompassed by the determination made in step S1508.

The above description of the sequences illustrated by the flowcharts of FIG. 14 and FIG. 15 have been made assuming the display device of the present invention is being utilized in the portrait orientation. Examples of the display device being utilized in the portrait orientation are depicted in FIGS. 3A-3K.

It is also an object of the present invention to allow a user to modify the positioning of a split user input interface that is displayed on either the main display or flexible display of a display device according to the present invention. This is beneficial because there are a variety of different ways of holding the display device, and for each different holding arrangement a unique positioning of the split user input interface may be preferred.

Figure 16A:
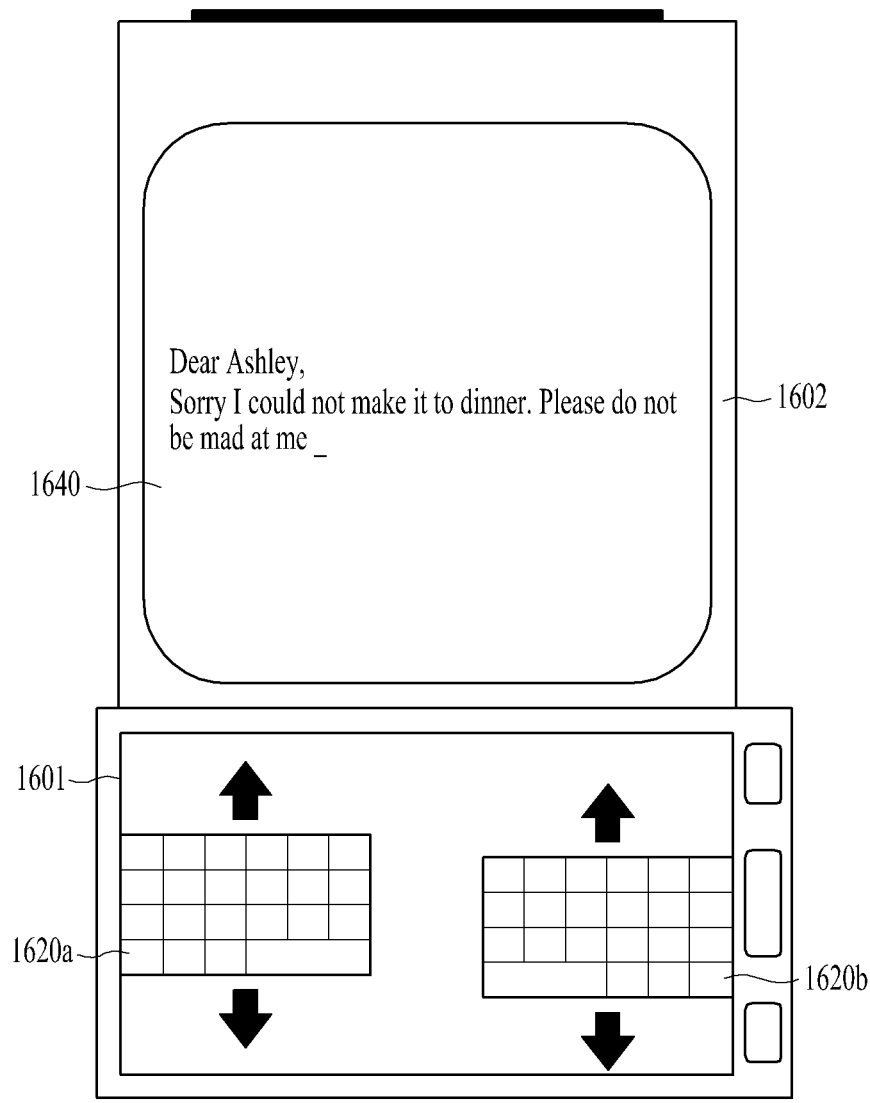
FIG. 16A illustrates a method for operating a position modification feature while the display device is in a landscape orientation, according to the present invention.

For instance, FIG. 16A illustrates the display device being utilized in the landscape orientation and the user input interface being split into a first portion 1620a and a second portion 1620b. In the landscape orientation, both the first portion 1620a and the second portion 1620b may be displayed on the main display 1601 while other objects such as a typing window 1640 may be displayed on the flexible display 1602. The arrows represent possible directions for modifying the first portion 1620a and second portion 1620b of the split user input interface. In this case the first portion 1620a and the second portion 1620b may be adjusted by moving the positioning along a vertical direction.

Figure 16B:
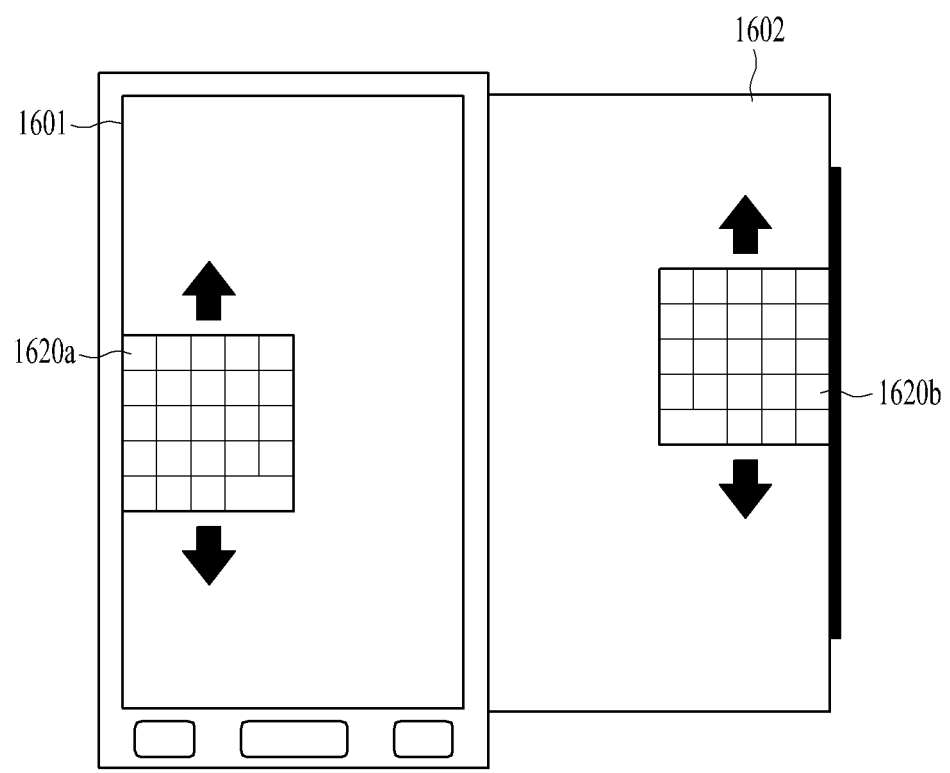
FIG. 16B illustrates a method for operating a position modification feature while the display device is in a portrait orientation, according to the present invention.

FIG. 16B illustrates the display device being utilized in the portrait orientation and the user input interface being split into a first portion 1620a and a second portion 1620b. In the portrait orientation, the first portion 1620a may be displayed on the main display 1601 and the second portion 1620b may be displayed on the flexible display 1601. The arrows represent possible directions for modifying the first portion 1620a and second portion 1620b of the split user input interface. In this case the first portion 1620a and the second portion 1620b may be adjusted by moving the positioning along a vertical direction.

In order to initiate the positioning modification of the first portion 1620a and second portion 1620b for a split user input interface, a user may first enter into a modification mode on the display device. Once in the modification mode the user may contact either the main display 1601 or flexible display 1602 at a position over the first portion 1620a and second portion 1620b (touch input) to directly move the display of the first portion 1620a and the second portion 1620b. For example a user's touch input for moving the first portion 1620a seen in FIG. 16A may be comprised of an initial contact over the first portion 1620a that is displayed on the main display 1601, and then sliding the touch input contact to a new position and finally releasing the touch input contact at the new position. Then the display for the first portion 1620a will be planted at the new position on the main display 1601. Another example involving the second portion 1620b displayed on the flexible display 1602 in FIG. 16B may be comprised of an initial touch input contact over the second portion 1620b, and then sliding the touch input contact to a new position on the flexible display 1620b and then releasing the touch input contact at the new position. Then the display for the second portion 1620b will be planted at the new position on the flexible display 1602.

Figure 17A:
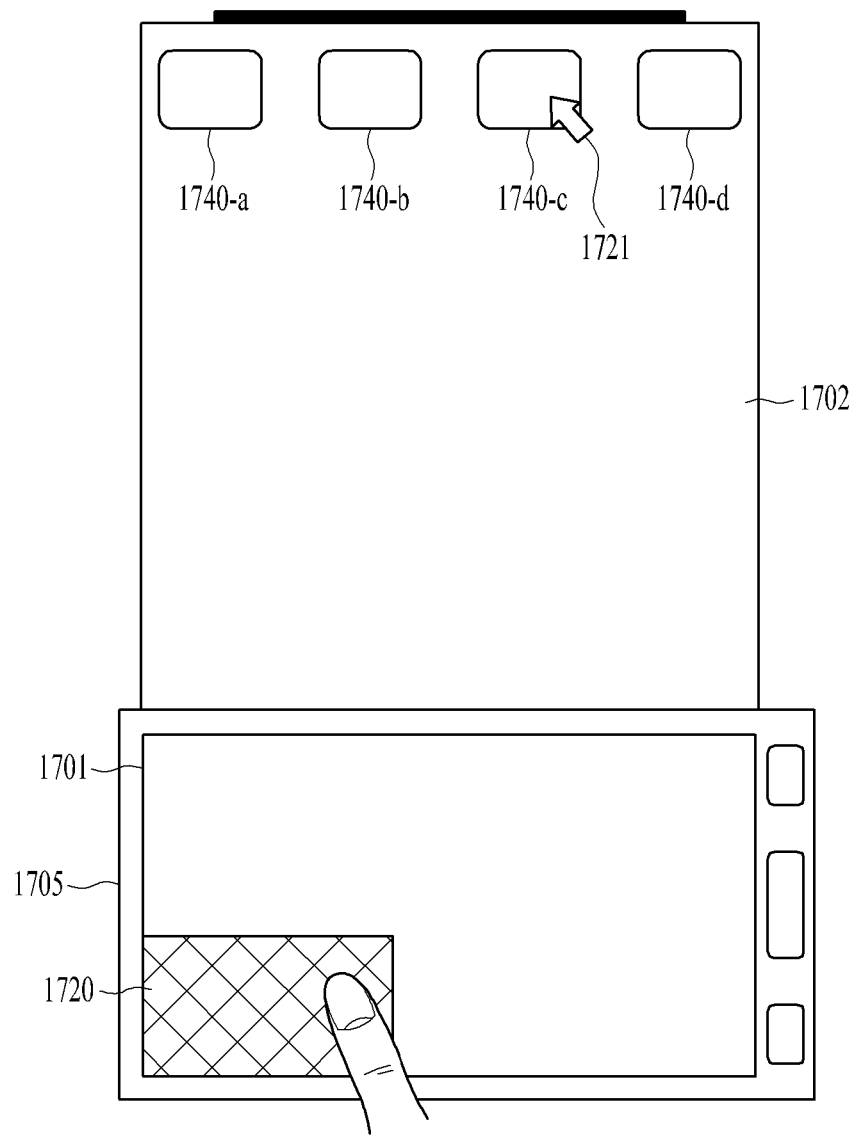
FIG. 17A illustrates a method for operating a touchpad interface feature, according to the present invention.

According to another object of the invention, an area of the touch sensitive main display is dedicated to serve as a touchpad interface 1720, as illustrated in FIG. 17A. The touchpad interface 1720 is illustrated in FIG. 17A as taking up a space located in the lower left-hand corner of the main display 1701. However, it is within the scope of the present invention to place the touchpad area anywhere within the main display 1701. When the display device is being operated in the landscape orientation as in FIGS. 17A and 17B, it may be beneficial to place the touchpad interface 1720 in one of the lower corners of the main display 1701 to allow a user to utilize the touchpad interface with the one hand that is holding the display device. Alternatively, when the display device is being operated in the landscape orientation it is within the scope of the present invention to allow the entire main display 1701 to operate as the touchpad interface 1720 while other objects to be controlled and selected may be displayed on the flexible display 1702.

The touchpad interface 1720 is a dedicated area within the main display 1701 where a user may initiate a touch input contact on the touchpad interface 1720 to control the movement of a pointer 1721. So the movement of the pointer 1721 will mimic the movement of the touch input contact on the touchpad interface 1720. By moving the user's touch input contact across the touchpad interface 1720 without breaking contact, the corresponding pointer 1721 will move across the flexible display 1702.

Now FIG. 17A is depicted as displaying a plurality of icons 1740-*a*, 1740-*b*, 1740-*c* and 1740-*d* on the flexible display 1702. Each of the plurality of icons are a visual representation of a unique application that may be run on the display device. If the pointer 1721 is controlled by the user's touch input movement on the touchpad interface 1720 to hover over third icon 1740-*c* as illustrated in FIG. 17A, the icon 1740 may be activated by a subsequent touch input on the touchpad interface 1720.

For example, once the user has manipulated a touch input contact over the touchpad interface 1720 to move the pointer 1721 over the third icon 1740-*c*, a selection touch input may be executed in the form of a double tap. To accomplish the double tap, the user must accomplish two tap input contacts on the touchpad interface 1720 within a short predetermined time of each other. A single tap input contact may be described as a touch input that contacts the touch sensitive main display 1701 and then releases the contact within a short predetermined amount of time. Then to accomplish the double tap, a first and second tap input contacts must be completed, where the second tap input contact must be completed within a short predetermined time of the first tap input contact completing.

Alternatively, if the initial touch input contact on the touchpad interface 1720 is allowed to hover over the third icon 1740-*c* for a predetermined amount of time, this may be recognized as a selection touch input. Alternatively, without lifting the initial touch input, the user may press down on the touchpad interface 1720 with a greater pressure and this in turn may be recognized to be a selection touch input.

Figure 17B:
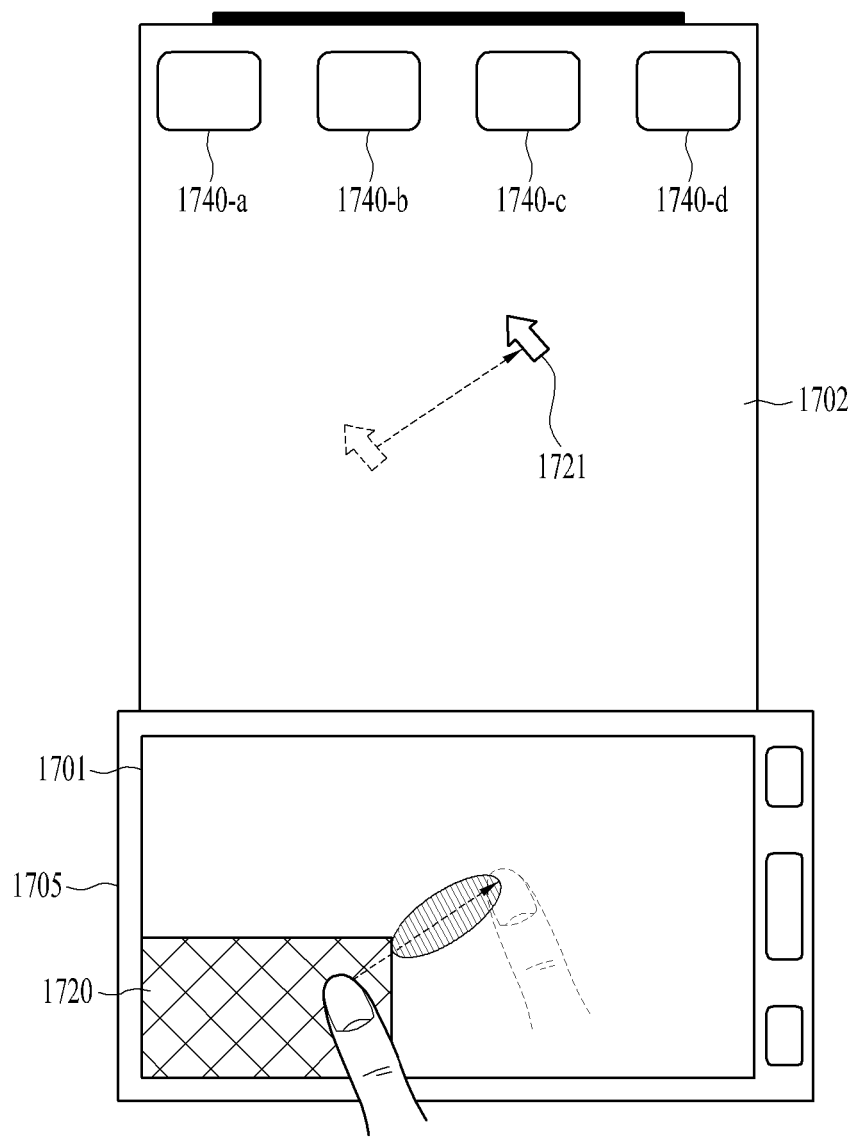
FIG. 17B illustrates a special characteristic of the touchpad interface feature, according to the present invention.

FIG. 17B illustrates the situation where an initial touch input contact begins within the touchpad interface 1720 and then ventures outside of the touchpad interface 1720. In such a situation, the user's initial touch input contact that began within the touchpad interface 1720 may still be recognized and used to control the movement of the pointer 1721 to mimic the movement of the initial touch input. When the initial touch input is finally lifted while outside of the touchpad interface 1720, the pointer 1721 may reset to a default position on a non-touchpad interface area, or may remain at the position it is left in.

It will be apparent to those skilled in the art that various modifications and variations can be made in the present invention. Thus, although the foregoing description has been described with reference to specific examples and embodiments, these are not intended to be exhaustive or to limit the invention to only those examples and embodiments specifically described.

For instance, the length corresponding to two times the width length of the main display has been referenced throughout this description as a default maximum length of the flexible display that is allowed to be pulled out of the display device body. However, it should be understood that the flexible display may be allowed to be pulled out a length that is greater, or shorter, than two times the width length of the main display.

What is claimed is:

1. A display device, the display device comprising:
    a main device body that includes at least a main display having a set length, wherein a user input interface is displayed on the main display;
    a flexible display that is rolled up;
    a touch input detecting unit configured to detect a touch input contact on the main display;
    a measuring unit configured to measure a length of a portion of the flexible display that is displayed; and
    a processor configured to receive the measured length of the flexible display, and, in response to the touch input, determine whether to transition the display of the user input interface from the main display to the flexible display based on the measured length of the flexible display.

2. The display device of claim 1, further comprising:
    a flexible display housing within the main device body configured to house the flexible display.

3. The display device of claim 2, wherein the length of the portion of the flexible display is measured by measuring a length of the flexible display that is pulled out from within the flexible display housing.

4. The display device of claim 1, wherein the touch input on the main display is initiated over an area that overlaps the user input interface.

5. The display device of claim 1, wherein when the measured length of the flexible display is a first length that is shorter than the set length of the main display, the processor controls the display of the user input interface to remain on the main display in response to the touch input.

6. The display device of claim 1, wherein when the measured length of the flexible display is a second length that is at least equal to the set length of the main display, the processor enables a display of the user input interface to be displayed on the flexible display in response to the touch input.

7. The display device of claim 6, wherein the touch input maintains contact from a first contact point to a second contact point on the main display.

8. The display device of claim 6, wherein the touch input maintains contact from a first contact point on the main display to a second contact point on the flexible display.

9. The display device of claim 1, wherein when the measured length of the flexible display is a second length that is at least equal to the set length of the main display, the processor controls the display of the user input interface to partition into at least a first portion that is displayed on the main display and a second portion that is displayed on the flexible display in response to the touch input.

10. The display device of claim 9, wherein the touch input comprises:
    a first touch input that maintains contact on the main display over a first half of the user input interface, and a second touch input that maintains contact on the main display from a first contact point to a second contact point that overlaps over a second half of the user input interface.

11. The display device of claim 9, wherein the touch input comprises:
a first touch input that maintains contact on the main display over a first half of the user input interface, and
a second touch input that maintains contact from a first contact point that overlaps over a second half of the user interface on the main display to a second contact point located on the flexible display.

12. The display device of claim 9, wherein a range of a user's finger is detected by the touch input detecting unit, and the processor is configured to control the size of the first portion and the second portion to be displayed within the detected range of the user's finger.

13. The display device of claim 1, wherein when the measured length of the flexible display is a third length that is greater than the set length of the main display, the processor controls the display of the user input interface to be displayed on the flexible display in response to the touch input.

14. The display device of claim 13, wherein a new user input interface is displayed on the flexible display.

15. The display device of claim 13, wherein a new user input interface that is transitioned to be displayed on the flexible display when the measured length of the flexible display is greater than the set length of the main display is different from a user input interface that is displayed on the flexible display when the measured length of the flexible display is equal to the set length of the main display.

16. The display device of claim 1, wherein when the measured length of the flexible display is a fourth length that is equal to two times the set length of the main display, the processor controls the display of the user input interface to be displayed on the flexible display in response to the touch input.

17. The display device of claim 16, wherein a new user input interface is transitioned to be displayed on the flexible display.

18. The display device of claim 16, wherein a new user input interface that is transitioned to be displayed on the flexible display when the measured length of the flexible display is equal to two times the set length of the main display is different from a user input interface that is displayed on the flexible display when the measured length of the flexible display is equal to the set length of the main display.

19. A display device, the display device comprising:
a main device body that includes at least a main display having a set length, wherein a user input interface is displayed on the main display;
a flexible display that is rolled up;
a measuring unit configured to measure a length of the flexible display that is pulled out from the flexible display housing; and
a processor configured to receive the measured length of the flexible display that is pulled out from the flexible display housing, and determine whether to transition the display of the user input interface from the main display to the flexible display based on the measured length of the flexible display that is pulled out from the flexible display housing.

20. The display device of claim 19, further comprising:
a flexible display housing within the main device body configured to house the flexible display.

21. The display device of claim 20, wherein the length of the portion of the flexible display is measured by measuring a length of the flexible display that is pulled out from within the flexible display housing.

22. The display device of claim 19, wherein when the measured length of the flexible display is a first length that is shorter than the set length of the main display, the processor controls the display of the user input interface to remain on the main display.

23. The display device of claim 19, wherein when the measured length of the flexible display is a second length that is at least equal to the set length of the main display, the processor controls the display of the user input interface to be displayed on the flexible display.

24. The display device of claim 19, wherein when the measured length of the flexible display is a second length that is at least equal to the set length of the main display, the processor controls the display of the user input interface to partition into at least a first portion that is displayed on the main display and a second portion that is displayed on the flexible display.

25. The display device of claim 24, wherein a range of a user's finger is detected by the touch input detecting unit, and the processor is configured to control the size of the first portion and the second portion to be displayed within the detected range of the user's finger.

26. The display device of claim 19, wherein a new user input interface that is transitioned to be displayed on the flexible display when the measured length of the flexible display is greater than the set length of the main display is different from a user input interface that is displayed on the flexible display when the measured length of the flexible display is equal to the set length of the main display.

27. The display device of claim 19, wherein when the measured length of the flexible display is a fourth length that is equal to two times the set length of the main display, the processor controls the display of the user input interface to be displayed on the flexible display in response to the touch input.

28. The display device of claim 27, wherein a new user input interface is transitioned to be displayed on the flexible display.

29. The display device of claim 27, wherein a new user input interface that is transitioned to be displayed on the flexible display when the measured length of the flexible display is equal to two times the set length of the main display is different from a user input interface that is displayed on the flexible display when the measured length of the flexible display is equal to the set length of the main display.

30. A method for transitioning a display of a user input interface by a display device, the method comprising:
displaying the user input interface on a main display of the display device;
exposing a rolled up flexible display for display;
measuring a length of the flexible display that is exposed;
detecting a touch input contact on the main display; and
controlling the display of the user input interface based on the measured length of the flexible display that is exposed and the detected touch input.

31. The method of claim 30, further comprising:
receiving an incoming call on the display device;
displaying a message at a position on the main display that overlaps the user input interface indicating the incoming call is being received, and
answering the incoming call by contacting the main display at a position that corresponds to the message.

32. A method for transitioning a display of a user input interface by a display device, the method comprising:
- displaying the user input interface on a main display of the display device;
- exposing a rolled up flexible display for display;
- measuring a length of the flexible display that is exposed; and
- controlling the display of the user input interface based on the measured length of the flexible display that is exposed.

33. The method of claim 32, further comprising:
- receiving an incoming call on the display device;
- displaying a message at a position on the main display that overlaps the user input interface indicating the incoming call is being received, and
- answering the incoming call by contacting the main display at a position that corresponds to the message.

\* \* \* \* \*